(12) United States Patent
Chi et al.

(10) Patent No.: US 12,744,441 B2
(45) Date of Patent: Sep. 22, 2026

(54) STATOR MODULE AND CONVEYOR SYSTEM

(71) Applicant: SHANGHAI GOLYTEC AUTOMATION CO. , LTD., Shanghai (CN)

(72) Inventors: Feng Chi, Shanghai (CN); Lin Guo, Shanghai (CN); Jinming Zhou, Shanghai (CN)

(73) Assignee: SHANGHAI GOLYTEC AUTOMATION CO., LTD., Shanghai (CN)

( * ) Notice: Subject to any disclaimer, the term of this patent is extended or adjusted under 35 U.S.C. 154(b) by 343 days.

(21) Appl. No.: 18/574,067

(22) PCT Filed: Mar. 3, 2023

(86) PCT No.: PCT/CN2023/079627

§ 371 (c)(1),
(2) Date: Dec. 25, 2023

(87) PCT Pub. No.: WO2024/077849

PCT Pub. Date: Apr. 18, 2024

(65) Prior Publication Data

US 2025/0105716 A1 Mar. 27, 2025

(30) Foreign Application Priority Data

Oct. 12, 2022 (CN) ........................ 202222681738.1
Nov. 21, 2022 (CN) ........................ 202211455412.5
Nov. 21, 2022 (CN) ........................ 202223092070.3

(51) Int. Cl.
*H02K 41/02* (2006.01)
*B65G 54/02* (2006.01)
(Continued)

(52) U.S. Cl.
CPC ............ *H02K 41/02* (2013.01); *B65G 54/02* (2013.01); *H02K 1/12* (2013.01); *H02K 3/26* (2013.01);
(Continued)

(58) Field of Classification Search
CPC ........... H02K 41/02; H02K 1/12; H02K 3/26; H02K 3/28; H02K 9/04; H02K 2203/03;
(Continued)

(56) References Cited

U.S. PATENT DOCUMENTS 6,191,507 B1 * 2/2001 Peltier .................... B65G 54/02 318/135
6,876,107 B2 * 4/2005 Jacobs ............. B29C 66/83413 318/135
(Continued)

FOREIGN PATENT DOCUMENTS

CN 103312115 A 9/2013
CN 104380585 A 2/2015
(Continued)

OTHER PUBLICATIONS

Office Action of counterpart JP application No. 2024-540988 issued on Jul. 8, 2025.
(Continued)

*Primary Examiner* — Mark A Deuble
(74) *Attorney, Agent, or Firm* — The Sun IP Law

(57) ABSTRACT

Embodiments of the disclosure provide a stator module and a conveyor system. The stator module includes a stator body and an armature winding, wherein the armature winding is fixedly arranged on the stator body, the armature winding is provided with an upper surface and a lower surface which are oppositely arranged in a first direction, and a first splicing surface and a second splicing surface which are oppositely arranged in a second direction perpendicular to
(Continued)

the first direction, the armature winding is provided with a first protrusion, and the first protrusion protrudes from the first splicing surface in the second direction, wherein the armature winding is provided with a plurality of armature coils arranged periodically, and at least part of the plurality of the armature coils are arranged in the first protrusion.

25 Claims, 12 Drawing Sheets

(51) Int. Cl.
*H02K 1/12* (2006.01)
*H02K 3/26* (2006.01)
*H02K 3/28* (2006.01)
*H02K 9/04* (2006.01)

(52) U.S. Cl.
CPC ................. *H02K 3/28* (2013.01); *H02K 9/04* (2013.01); *H02K 2203/03* (2013.01)

(58) Field of Classification Search
CPC .. H02K 2201/15; H02K 3/47; H02K 2211/03; H02K 2213/03; H02K 41/031; H02K 11/33; H02K 2213/12; H02K 1/18; H02K 1/20; H02K 9/22; H02K 15/02; B65G 54/02
USPC .......................................................... 198/619
See application file for complete search history.

(56) References Cited

U.S. PATENT DOCUMENTS 9,997,985 B2 * 6/2018 Prüssmeier ............ H02K 41/03
10,243,441 B2 * 3/2019 Jacobs ................. H02K 41/031
10,479,609 B2 * 11/2019 Peebles .................. B65G 54/02
12,479,097 B2 * 11/2025 Huang ........................ B25J 5/02
12,515,895 B2 * 1/2026 Chi ........................ B65G 54/02
2016/0176659 A1 * 6/2016 Aumann ................ B65G 54/02 198/619
2018/0317313 A1 11/2018 Kegeler
2021/0099119 A1 4/2021 Sun

FOREIGN PATENT DOCUMENTS

CN 108328249 A 7/2018
CN 109217518 A 1/2019
CN 109217618 A 1/2019
CN 109889014 A 6/2019
CN 111277110 A 6/2020
CN 114362472 A 4/2022
CN 217282644 U 8/2022
EP 4447268 A1 * 10/2024 ........... H02K 41/031
JP H02-097266 A 4/1990
JP 2009071939 A 4/2009
WO 2011049298 A2 4/2011
WO 2014117350 A1 8/2014
WO 2015189979 A1 12/2015

OTHER PUBLICATIONS

Office Action of counterpart KR application No. 10-2024-7022675 issued on May 12, 2025.
The supplementary search report of counterpart CN application No. 202211455412.5 issued on Jan. 2, 2024.
The search report of counterpart EP application No. 23825353.8 dated Oct. 31, 2024.
The search report of counterpart EP application No. 23825353.8 issued on Feb. 3, 2025.

* cited by examiner

Fig. 3
11 111 13 12
114
112 113 13 U V W 12
Z X
Fig. 4
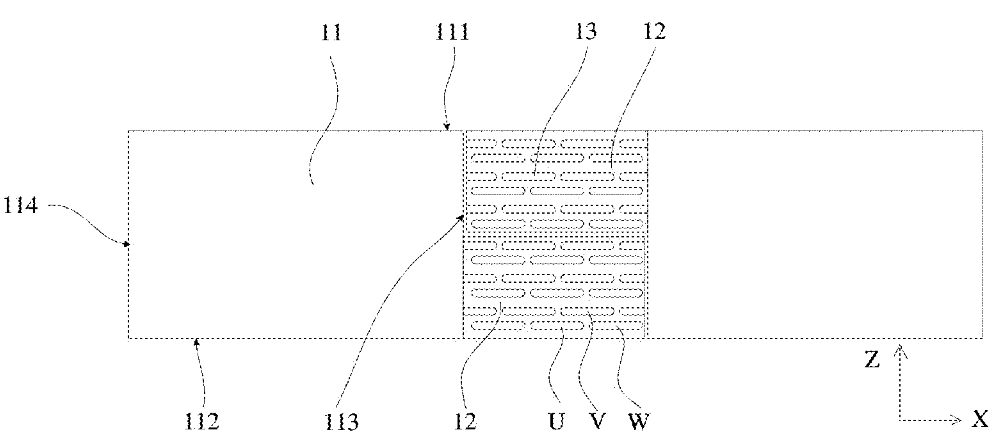
Fig. 5
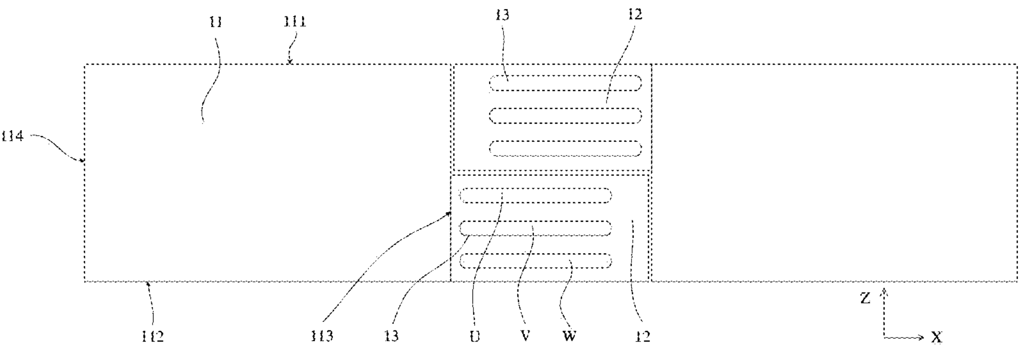

STATOR MODULE AND CONVEYOR SYSTEM

CROSS-REFERENCE TO RELATED APPLICATION

The disclosure claims priority to Chinese Patent Application No. 202211455412.5, filed on Nov. 21, 2022 and entitled "Stator and Conveyor System", Chinese Patent Application No. 202223092070.3, filed on Nov. 21, 2022 and entitled "Conveyor System", and Chinese Patent Application No. 202222681738.1, filed on Oct. 12, 2022 and entitled "Stator Module, Linear Motor and Linear Conveyor".

TECHNICAL FIELD

The disclosure relates to the field of conveyors, in particular to a stator module and a conveyor system.

BACKGROUND

A conveying line generally includes a mover module and a stator module, the mover module being arranged on a guide rail and moving along the guide rail under the drive of the stator module. The stator module generally includes a linear stator and an arc stator which are spliced to achieve the extension of the conveying line. For this conveyor system, the repeated positioning accuracy of the movement of the mover module at a joint is relatively low, so that it is necessary to provide a new conveyor system.

SUMMARY

The disclosure mainly aims to provide a stator module and a conveyor system, so as to solve the problem of relatively low repeated positioning accuracy of the movement of a mover module at a joint in the related art.

In order to achieve the above object, according to one aspect of the disclosure, a stator module is provided. The stator module includes: a stator body; and an armature winding, which is fixedly arranged on the stator body, the armature winding being provided with an upper surface and a lower surface which are oppositely arranged in a first direction, and a first splicing surface and a second splicing surface which are oppositely arranged in a second direction perpendicular to the first direction, the armature winding being provided with a first protrusion, and the first protrusion protruding from the first splicing surface in the second direction. The armature winding is provided with a plurality of armature coils arranged periodically, and at least a part of the plurality of the armature coils is/are arranged in the first protrusion.

In some embodiments, the armature winding further includes a second protrusion, the second protrusion protruding from the second splicing surface in a direction opposite to the second direction, and at least part of the plurality of the armature coils being arranged in the second protrusion.

In some embodiments, the armature winding includes a plurality of U-phase armature coils, a plurality of V-phase armature coils and a plurality of W-phase armature coils, the U-phase armature coils, the V-phase armature coils and the W-phase armature coils together forming a plurality of three-phase armature windings, the armature winding being formed by stacking a plurality of layers of the armature coils, and in the second direction, the armature coils being periodically arranged in phase sequence.

In some embodiments, for any three-phase armature winding, the U-phase armature coil, the V-phase armature coil and the W-phase armature coil are located in a same layer, and in the second direction, the U-phase armature coil, the V-phase armature coil and the W-phase armature coil are arranged at intervals in phase sequence. Or, in the first direction, for any three-phase armature winding, the U-phase armature coil and the W-phase armature coil are located in a same layer, and the V-phase armature coil is located in an adjacent layer and at a center of the U-phase armature coil and the W-phase armature coil. Or, in the first direction, the U-phase armature coil, the W-phase armature coil and the V-phase armature coil are distributed in three layers.

In some embodiments, in the first direction, the first protrusion is provided with a first upper surface and a first lower surface which are oppositely arranged, and the first upper surface is co-planar with the upper surface. In the first direction, the second protrusion is provided with a second upper surface and a second lower surface which are oppositely arranged, and the second lower surface is co-planar with the lower surface. The first lower surface is co-planar with the second upper surface, or, the first lower surface is parallel to the second upper surface, and a distance between the first lower surface and the second upper surface is 0.1 mm-1 mm.

In some embodiments, the stator body is fan-shaped, the armature winding is arc-shaped, and a plane where the first splicing surface is located is perpendicular to a plane where the second splicing surface is located. Or, a plane where an end surface of the first protrusion is located is perpendicular to a plane where an end surface of the second protrusion is located.

In some embodiments, the stator module further includes a first driver, which is fixedly arranged on the stator body and electrically connected with the armature winding. An electrical connection mode between the first driver and the armature winding includes at least one of a wire connection, a plug connection, and welding. Or, the stator module further includes a first driver, which is fixedly arranged on the stator body, the first driver being printed with the armature coils.

In some embodiments the first driver is an integrated circuit board, and the first driver is a PCB winding when the first driver is printed with the armature coils.

In some embodiments, there are plurality of first drivers printed with the armature coils, the plurality of first drivers are stacked in the first direction, and/or, the plurality of first drivers are stacked in the second direction, and the plurality of first drivers form the armature winding.

In some embodiments, the stator module further includes: a second driver, which is fixedly arranged on the stator body; and a third driver, which is fixedly arranged on the stator body and electrically connected with the second driver, the third driver being printed with the armature coils. An electrical connection mode between the second driver and the third driver includes at least one of a wire connection, a plug connection, welding, a flexible circuit board connection, and an electromagnetic coupling connection.

In some embodiments, the third driver is formed by stacking a plurality of layers of printed circuit boards each layer of the printed circuit board is printed with the armature coil, and the armature coils on at least two adjacent layers of the printed circuit boards together form a three-phase armature winding.

In some embodiments, at least one of the second driver and the third driver is an integrated circuit board, and the third driver is a PCB winding when the third driver is the integrated circuit board.

In some embodiments, there are a plurality of third drivers, the plurality of third drivers are stacked in the first direction, and/or the plurality of third drivers are stacked in the second direction, and the plurality of third drivers form the armature winding.

In some embodiments, the stator module further includes a cooling fan, which is installed on the stator body, the cooling fan being provided with an air outlet. The armature winding is arranged on a side, away from the air outlet, of the stator body, the stator body is provided with an air guide channel communicating with the air outlet, and airflow from the air outlet flows through the armature winding through the air guide channel.

In some embodiments, the stator body is provided with a first surface facing the air outlet and a second surface facing away from the air outlet, the second surface is provided with a groove into which the armature winding is partly inserted, the air guide channel penetrates through the first surface and the second surface, and the air guide channel communicates with a side groove wall of the groove.

In some embodiments, there are a plurality of air guide channels, all the air guide channels are arranged at intervals in the second direction, and a central axis in an extension direction of each air guide channel is perpendicular to the second direction.

In some embodiments, the air guide channels are distributed on both sides of the armature winding in a third direction, and the third direction is perpendicular to the second direction.

In some embodiments, the stator body is provided with a first surface facing the air outlet, the first surface is provided with a mounting groove, and the stator body further includes a circuit board, the circuit board being located in the mounting groove and electrically connected with the armature winding.

In some embodiments, the stator module further includes a fixed support, the cooling fan being connected to the stator body through the fixed support.

In some embodiments, the stator module further includes a cooling panel, the cooling panel being arranged at a bottom of the cooling fan, and the cooling fan being connected to the fixed support through the cooling panel.

According to another aspect of the disclosure, a conveyor system is provided, which includes: a base; a guide rail, which is laid in a conveying direction and fixedly arranged on the base; and a plurality of above stator modules, the plurality of stator modules being spliced to each other in the conveying direction, and the stator body being fixedly arranged on the base.

In some embodiments, the plurality of stator modules are successively spliced in the conveying direction. A mover module is in sliding fit with the guide rail and coupled with an armature winding.

In some embodiments, for two adjacent stator modules, the first protrusion of one armature winding is spliced to the second protrusion of the other armature winding, and at least part of the armature coils in the first protrusion and at least part of the armature coils in the second protrusion are stacked together to form at least one three-phase armature winding.

In some embodiments, the armature winding includes a plurality of U-phase armature coils, a plurality V-phase armature coils and a plurality W-phase armature coils, the U-phase armature coils, the V-phase armature coils and the W-phase armature coils together forming a plurality of three-phase armature windings, the armature winding being formed by stacking a plurality of layers of the armature coils, and in the second direction, the armature coils being periodically arranged in phase sequence. For any three-phase armature winding formed by splicing the first protrusion and the second protrusion, the U-phase armature coil, the V-phase armature coil and the W-phase armature coil are located in a same layer, and in the second direction, the U-phase armature coil, the V-phase armature coil and the W-phase armature coil are arranged at intervals in phase sequence. Or, in the first direction, for any three-phase armature winding, the U-phase armature coil and the W-phase armature coil are located in a same layer, and the V-phase armature coil is located in an adjacent layer and at a center of the U-phase armature coil and the W-phase armature coil. Or, in the first direction, the U-phase armature coil, the W-phase armature coil, and the V-phase armature coil are distributed in three layers.

In some embodiments, the first protrusion is provided with a first upper surface and a first lower surface which are oppositely arranged in the first direction, and the first upper surface is co-planar with the upper surface. The second protrusion is provided with a second upper surface and a second lower surface which are oppositely arranged in the first direction, and the second lower surface is co-planar with the lower surface. For two adjacent stator modules, the upper surface of one armature winding is co-planar with the upper surface of the other armature winding, the lower surface of one armature winding is co-planar with the lower surface of the other armature winding, the first lower surface of one armature winding is parallel to the second upper surface of the other armature winding, and a distance between the first lower surface and the second upper surface is 0.1 mm-1 mm.

In some embodiments, the stator module further includes first drivers, which are fixedly arranged on the stator body and electrically connected with the armature winding, the first drivers being signal transmission connected through optical fiber.

In some embodiments, the guide rail is provided with an auxiliary guide rail and a first guide rail, the auxiliary guide rail and the first guide rail are both configured to be in sliding fit with the mover module, and a guide accuracy of the auxiliary guide rail is higher than a guide accuracy of the first guide rail.

In some embodiments, in the conveying direction, the auxiliary guide rail is parallel to the first guide rail, the auxiliary guide rail is arranged on at least one side of the first guide rail, and the guide rail further includes a second guide rail corresponding to the auxiliary guide rail, the second guide rail being stacked on the first guide rail in a direction away from the base, and a length of the second guide rail being less than or equal to a length of the auxiliary guide rail.

In some embodiments, in the conveying direction, the auxiliary guide rail and the first guide rail are connected to each other, and each of the auxiliary guide rail and the first guide rail is provided with a chamfer at a joint.

The disclosure has the beneficial effects that the armature winding of the stator module is provided with the plurality of armature coils arranged periodically, and at least part of the plurality of the armature coils are arranged in the first protrusion. Since an end of the armature winding is provided with the first protrusion, and the first protrusion protrudes from the first splicing surface in the second direction, the mover module may still have relatively precise kinematic accuracy at a joint of two adjacent stator modules, and therefore the mover module may still have a higher speed when moving to the joint, so as to ensure the continuity of the high-speed operation of the mover module.

BRIEF DESCRIPTION OF THE DRAWINGS

The accompanying drawings constituting a part of the disclosure are used to provide a further understanding of the disclosure, and the exemplary embodiments of the disclosure and the description thereof are used to explain the disclosure, but do not constitute improper limitations to the disclosure. In the accompanying drawings:

FIG. 3 is a partial sectional schematic structural diagram when two adjacent stator modules are matched according to some embodiments of the disclosure.

FIG. 4 is a partial sectional schematic structural diagram when two adjacent stator modules are matched according to other embodiments of the disclosure.

FIG. 5 is a partial sectional schematic structural diagram when two adjacent stator modules are matched according to still other embodiments of the disclosure.

Figure 1:
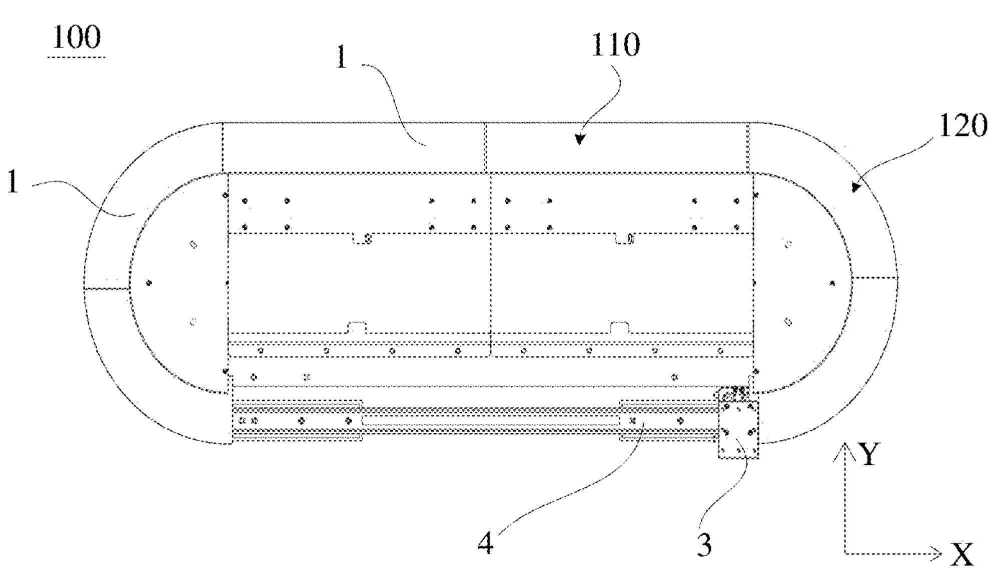
FIG. 1 is a schematic front view of a conveyor system according to some embodiments of the disclosure.

Herein, the above accompanying drawings include the following reference signs.

1. Stator module; 10. Stator body; 11. Armature winding; 111. Upper surface; 112. Lower surface; 113. First splicing surface; 114. Second splicing surface; 12. First protrusion; 121. First upper surface; 122. First lower surface; 13. Armature coil; 14. Second protrusion; 141. Second upper surface; 142. Second lower surface; 15. First driver; 16. Second driver; 17. Third driver; 18. Cooling fan; 181. Air outlet; 19. Air guide channel; 20. First surface; 201, Mounting groove; 21. Second surface; 211. Groove; 22. Circuit board; 23. Fixed support; 24. Cooling panel;

100. Conveyor system; 110. Linear stator segment; 115. First stator; 120. Arc stator segment; 125. Second stator; 2. Base; 3. Mover module; 31. First permanent magnet; 32. Second permanent magnet; 33. Matching groove; 34. Roller; 35, Guide groove; 4. Guide rail; 41. First guide rail; 42. Second guide rail; 5. Ball slider; 51. Slider body; 52. Ball; 53. Holding tank; 6. Auxiliary guide rail; 7. Optical fiber;

Z. First direction; X. Second direction; and Y. Third direction.

DETAILED DESCRIPTION OF THE EMBODIMENTS

The technical solutions in the embodiments of the disclosure will be clearly and completely described in conjunction with the accompanying drawings in the embodiments of the disclosure. It is apparent that the described embodiments are only a part of the embodiments of the disclosure, and not all of them. The following description of at least one exemplary embodiment is only exemplary in nature and is in no way intended to limit the disclosure, its application, or uses. All other embodiments obtained by those of ordinary skill in the art based on the embodiments of the disclosure without creative efforts are within the scope of protection of the disclosure.

It is to be noted that the terms used herein is only for the purpose of describing the specific implementation modes and is not intended to limit the exemplary implementation modes of the disclosure. As used herein, the singular form is also intended to include the plural form unless otherwise expressly stated in the context, and it should also be understood that when the terms “contain” and/or “include” are used in the specification, they indicate the presence of features, steps, operations, devices, components and/or combinations thereof.

Unless otherwise specified, the relative arrangement, numerical expressions and numerical values of parts and steps set forth in these embodiments do not limit the scope of the disclosure. Also, it should be understood that, for ease of description, the dimensions of various parts shown in the accompanying drawings are not drawn to scale. Techniques, methods, and devices known to those of ordinary skill in the related fields may not be discussed in detail, but should be regarded as part of the authorized description under appropriate circumstances. In all examples shown and discussed herein, any specific value should be interpreted as exemplary only and not as a limitation. Thus, other examples of the exemplary embodiments may have different values. It is to be noted that: similar numbers and letters refer to similar items in the following accompanying drawings, and thus, once an item is defined in one accompanying drawing, it does not require further discussion in subsequent accompanying drawings.

In conjunction with FIGS. 1 to 4, the embodiments of the disclosure provide a conveyor system 100, which includes a base 2, a plurality of mover modules 3, a guide rail 4 and a plurality of spliced stator modules 1. The plurality of spliced stator modules 1 may constitute a linear stator segment 110 and/or an arc stator segment 120. The mover modules 3 may move on the stator modules 1 to achieve transportation of articles.

Figure 2:
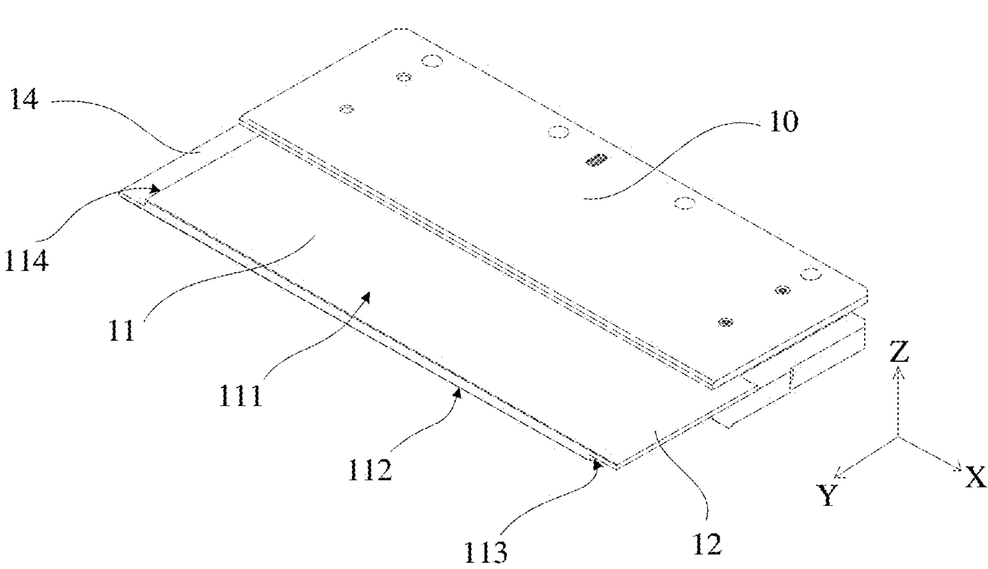
FIG. 2 is a schematic structural diagram of a stator module according to some embodiments of the disclosure.

As shown in FIGS. 1 to 3, the stator module 1 is applied to the conveyor system 100, and the conveyor system 100 may include the linear stator segment 110 and the arc stator segment 120. The linear stator segment 110 may include a plurality of linear stator modules spliced in a conveying direction, and the arc stator segment 120 may include a plurality of arc stator modules spliced in the conveying direction.

The stator module 1 includes a stator body 10 and an armature winding 11, the armature winding 11 being fixedly arranged on the stator body 10. A connection mode between the armature winding 11 and the stator body 10 is not limited in the embodiment, and the specific connection mode may be at least one of welding, bonding, screwing, and plugging.

In conjunction with FIG. 2, the armature winding 11 is provided with an upper surface 111 and a lower surface 112 which are oppositely arranged in a first direction Z, and a first splicing surface 113 and a second splicing surface 114 which are oppositely arranged in a second direction X. The first direction Z may be a thickness direction of the stator module 1, the second direction X may be a conveying direction of the conveyor system 100, and the first direction Z may be perpendicular to the second direction X. The first splicing surface 113 and the second splicing surface 114 are located between the upper surface 111 and the lower surface 112 and connect the upper surface 111 and the lower surface 112. The armature winding 11 is provided with a plurality of armature coils 13 arranged periodically. The armature coils 13 include a plurality of sets of U-phase armature coils, V-phase armature coils and W-phase armature coils, and the adjacent armature coils 13 may together constitute a three-phase armature winding. The plurality of three-phase armature windings are periodically energized, so that the armature winding 11 generates varying magnetic fields at different positions, and the magnetic fields are configured to be coupled with permanent magnets on the mover module 3 to drive the mover module 3 to move on the stator module 1. The armature winding 11 is also provided with a first protrusion 12, the first protrusion 12 protrudes from the first splicing surface 113 in the second direction X, that is, the first protrusion 12 has a certain length in the second direction X, and at least of the plurality of the armature coils 13 is/are arranged in the first protrusion 12.

It is understandable that the linear stator segment 110 and the arc stator segment 120 are formed by splicing the plurality of stator modules 1 together. In conjunction with FIGS. 3 to 5, since the stator module 1 in the embodiments is provided with the first protrusion 12 protruding from the first splicing surface 113, for two adjacent stator modules 1 needing to be spliced, the first protrusions 12 on the two stator modules 1 are spliced towards each other so as to facilitate the splicing and positioning of the two adjacent stator modules 1. More specifically, by stacking the two first protrusions 12 in the first direction Z, the upper surface 111 of one stator module 1 is flush with the lower surface 112 of the other stator module 1 so as to position the splicing of the two adjacent stator modules 1, thereby increasing the splicing accuracy of the two adjacent stator modules 1 and further increasing the kinematic accuracy of the mover module 3 at a joint of the stator modules 1. Further, for the stator module 1 having two splicing surfaces, only one splicing surface thereof is provided with the protrusion, and the stator module 1 having the single protrusion may be spliced with the other stator module 1 having the single protrusion, thereby increasing the splicing accuracy of the two adjacent stator modules 1, so that the mover module 3 still has higher control accuracy at the joint of the stator modules 1. The type of the adjacent stator modules 1 that may be spliced is not limited in the embodiments, for example, the stator module 1 having the single protrusion may be applied to the splicing of the linear stator modules, the splicing of the linear stator module and the arc stator module, the splicing of the arc stator modules, etc.

The specific arrangement structure of the armature coils 13 arranged in the first protrusion 12 will be described. It is understandable that, when the two adjacent stator modules 1 are spliced, the first protrusions 12 are stacked in the first direction Z, and at least part of the plurality of the armature coils 13 are arranged in the first protrusions 12, so that the armature coils 13 in the two stacked first protrusions 12 may together form at least one three-phase armature winding. The armature coils 13 in the first protrusions 12 are periodically energized, so that the three-phase armature winding formed by two adjacent first protrusions 12 generates an excitation current, and the two adjacent armature windings 11 may still generate a magnetic field at the joint. This magnetic field may be configured to drive the mover module 3 to move, so that the mover module 3 may still maintain higher control accuracy at the joint, and the mover module 3 has higher repeated positioning accuracy in the conveyor system 100.

It is understandable that, in the embodiments, the armature winding 11 is provided with the plurality of armature coils 13 arranged periodically, which may be understood as: the armature windings 11 may be arranged periodically in either the first direction Z or the second direction X, or in both the first direction Z and the second direction X, which may not be limited in the embodiment, and the specific arrangement will be described in detail below.

Further, the periodic arrangement of the armature coils 13 in the armature winding 11 in the first direction Z is not specifically limited in the embodiments. For example, in some embodiments, the three-phase armature windings are arranged in a single layer, that is, the armature coils 13 in the three-phase armature winding are arranged periodically in one layer, the armature coils 13 are arranged at intervals in UVW phase sequence in the second direction X, and the number of the layers of the armature coils 13 in the first direction Z may be one or more. Or, in some embodiments, the three-phase armature windings are arranged in two layers, the armature coils 13 in the three-phase armature winding are distributed in two layers, the U-phase armature coil and the W-phase armature coil are arranged in a same layer, the V-phase armature coil is arranged in an adjacent layer and located at a center of the U-phase armature coil and the W-phase armature coil, and the plurality of three-phase armature windings arranged on the basis of this structure are stacked in the first direction Z and/or the second direction X. For another example, in some embodiments, the three-phase armature windings are arranged in three layers, the armature coils 13 in the three-phase armature winding are distributed in three layers, and the UVW armature coils 13 are arranged in the adjacent layers. It is understandable that, since the adjacent armature coils 13 in the armature winding 11 together form the three-phase armature winding, the armature coils 13 are arranged in phase sequence in the second direction X, both in positive and negative phase sequence.

It is understandable that, the periodic arrangement of the armature coils 13 located in the first protrusion 12 may be the same as or different from the periodic arrangement of the armature coils 13 located in the armature winding 11. The number of the layers of the armature coils 13 located in the first protrusion 12 in the first direction Z may be the same as or different from the number of the layers of the armature coils 13 located in the armature winding 11 in the first direction Z.

Referring to FIG. 3, further, in some embodiments, in the first direction Z, the three-phase armature windings arranged in the first protrusion 12 may be distributed in the same layer, at least one complete three-phase armature winding is arranged in the first protrusion 12, and orthographic projections of the armature coils 13 in the two stacked first protrusions 12 in the first direction Z coincide. That is, the armature coils 13 in the two stacked first protrusions 12 together form a plurality of sets of stacked three-phase armature windings in the first direction Z, so that the two adjacent armature windings 11 may still form a relatively strong magnetic field at the joint, so as to increase the kinematic accuracy of the mover module 3 at the joint. It is understandable that the number of the layers of the armature coils 13 in the first protrusion 12 in the first direction Z may be one or more. Or, when the mover module 3 runs to the joint of the two adjacent stator modules 1, any stator module 1 may be energized, so that the excitation current is generated in the first protrusion 12, and then the other stator module 1 is energized, so that the excitation current is generated in the first protrusion 12 of the other stator module 1, thereby achieving the driving of the mover module 3, and making a manner of driving the mover module 3 by the conveyor system 100 more flexible.

Referring to FIG. 4, in some embodiments, in the first direction Z, the three-phase armature windings arranged in the first protrusion 12 may be distributed in two layers, and at least one complete three-phase armature winding is arranged in the first protrusion 12. That is, when the mover module 3 runs to the joint of the two adjacent stator modules 1, any stator module 1 may be energized, so that the excitation current is generated in the first protrusion 12, thereby achieving the driving of the mover module 3, and making the manner of driving the mover module 3 by the conveyor system 100 more flexible.

Referring to FIG. 5, in some embodiments, in the first direction Z, the three-phase armature windings arranged in the first protrusion 12 may be distributed in three layers, and at least one complete three-phase armature winding is arranged in the first protrusion 12. That is, when the mover module 3 runs to the joint of the two adjacent stator modules 1, any stator module 1 may be energized, so that the excitation current is generated in the first protrusion 12, thereby achieving the driving of the mover module 3, and making the manner of driving the mover module 3 by the conveyor system 100 more flexible. Or, when the mover module 3 runs to the joint of the two adjacent stator modules 1, any stator module 1 may be energized, so that the excitation current is generated in the first protrusion 12, and then the other stator module 1 is energized, so that the excitation current is generated in the first protrusion 12 of the other stator module 1, thereby achieving the driving of the mover module 3, and making the manner of driving the mover module 3 by the conveyor system 100 more flexible.

In summary, the embodiments of the disclosure provide the stator module 1, which includes the stator body 10 and the armature winding 11 fixedly connected with the stator body 10. The armature winding 11 is provided with the plurality of armature coils 13 arranged periodically, and the armature coils 13 include the plurality of U-phase armature coils, the plurality of V-phase armature coils and the plurality of W-phase armature coils. The armature windings at different positions are periodically energized, so that the armature windings 11 generate varying magnetic fields at different positions, and the magnetic fields are configured to be coupled with the permanent magnets on the mover module 3 to drive the mover module 3 to move on the stator module 1. Further, the armature winding 11 in the embodiments is provided with the upper surface 111 and the lower surface 112 which are oppositely arranged in the first direction Z, and the first splicing surface 113 and the second splicing surface 114 which are oppositely arranged in the second direction X perpendicular to the first direction Z. The first splicing surface 113 is further provided with the first protrusion 12 protruding therefrom, and at least part of the plurality of the armature winding 11 is/are arranged in the first protrusion 12. It is understandable that the arrangement of the first protrusion 12 may facilitate the splicing between two adjacent stator modules 1, and the splicing between the two adjacent stator modules 1 may rely on the first protrusion 12 and/or the first splicing surface 113 to realize the mutual positioning of the positions, thereby increasing the splicing accuracy between the two adjacent stator modules 1, so that when the mover module 3 runs to the joint of the adjacent stator modules 1, the mover module 3 still has higher kinematic accuracy. Since part of the plurality of the armature winding 11 is/are arranged in the first protrusion 12, the two adjacent stator modules 1 may still drive the three-phase armature winding to generate current excitation at the joint, so that the mover module 3 may still be driven at the joint of the two adjacent stator modules 1, the mover module 3 may still maintain higher control accuracy at the joint, and the mover module 3 has higher repeated positioning accuracy in the conveyor system 100.

Figure 6:
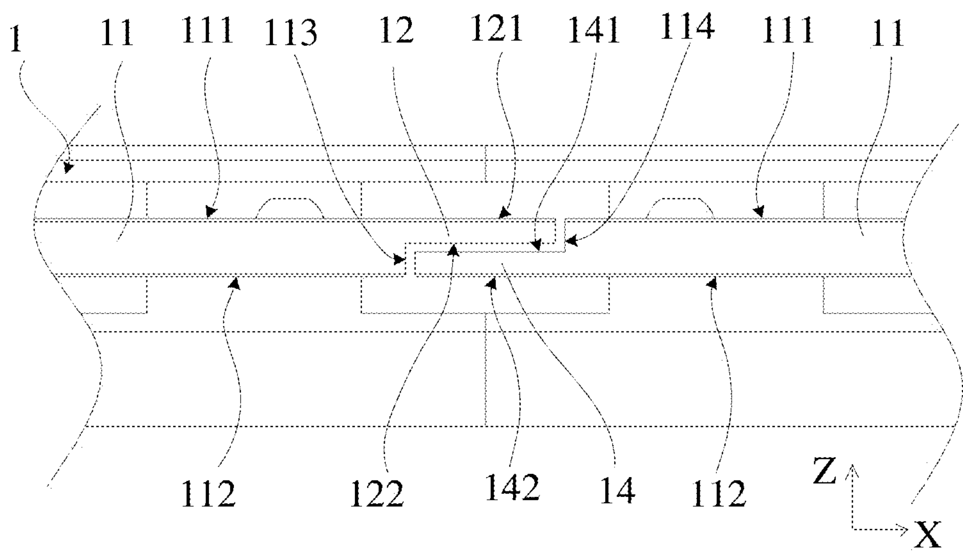
FIG. 6 is a schematic structural diagram from a perspective when two adjacent stator modules in a conveyor system are spliced according to some embodiments of the disclosure.

Referring to FIGS. 2 and 6, in some embodiments, the two splicing surfaces of the stator module 1 may be provided with the protrusions. Specifically, the armature winding 11 may further include a second protrusion 14, the second protrusion 14 protruding from the second splicing surface 114 in a direction opposite to the second direction X. The second protrusion 14 may be provided with one or more armature coils 13. The armature coil 13 may be at least one of the U-phase armature coil, the V-phase armature coil, and the W-phase armature coil. For the stator module 1 having two protrusions, a modular design of the stator module 1 may be realized, so as to form the linear stator segment 110 and the arc stator segment 120 by splicing the modular stator modules 1. The type of the adjacent stator modules 1 that may be spliced is not limited in the embodiments, for example, the stator module 1 having two protrusions may be applied to the splicing of the linear stator modules, the splicing of the linear stator module and the arc stator module, the splicing of the arc stator modules, etc.

It is understandable that, in the second direction X, the orthographic projection of the second protrusion 14 and the orthographic projection of the first protrusion 12 are misaligned, and this structure may enable the plurality of stator modules 1 to be successively spliced in the second direction X in the same arrangement mode. Further, in conjunction with FIGS. 6 to 9, taking the splicing of the two adjacent stator modules 1 as an example, since the two stator modules 1 are successively spliced in the second direction X in the same arrangement mode, the first protrusion 12 of one stator module 1 and the second protrusion 14 of the other stator module 1 are stacked in the first direction Z, that is, the splicing of the first protrusion 12 and the second protrusion 14 is achieved. It is understandable that the splicing of the first protrusion 12 and the second protrusion 14 may increase the installation accuracy of the two adjacent stator modules 1, so as to facilitate the splicing between the adjacent stator modules 1. In addition, since the armature coils 13 are arranged in each of the first protrusion 12 and the second protrusion 14, the mover module 3 may still be excited by the current at the joint of the two adjacent armature windings 11, so as to increase the control accuracy and kinematic accuracy of the mover module 3 at the joint of the armature windings 11, so that the mover module 3 has more precise repeated positioning accuracy on the conveyor system 100.

Further, the periodic arrangement mode of the armature coils 13 in the second protrusion 14 may be the same as or different from the periodic arrangement mode of the armature coils 13 in the armature winding 11. The periodic arrangement mode of the armature coils 13 in the second protrusion 14 may be the same as or different from the periodic arrangement mode of the armature coils 13 in the first protrusion 12. The number of armature coils 13 arranged in the second protrusion 14 may be the same as or different from the number of armature coils 13 arranged in the first protrusion 12. The number of the layers of the armature coils 13 in the second protrusion 14 in the first direction Z may be the same as or different from the number of the layers of the armature coils 13 in the first protrusion 12 in the first direction Z.

Figure 7:
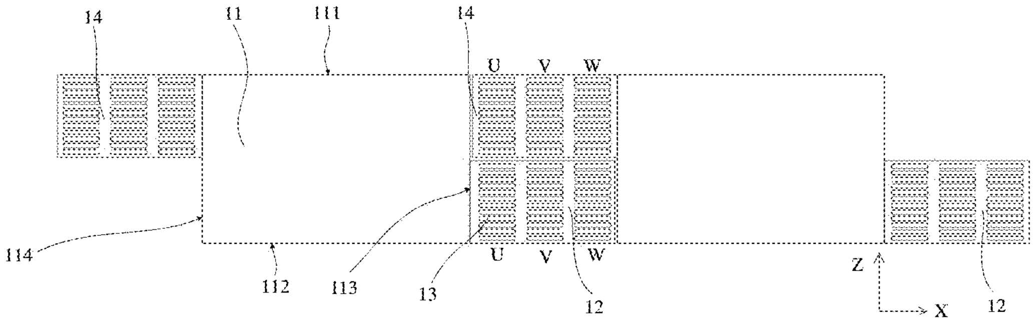
FIG. 7 is a partial sectional schematic structural diagram when two adjacent stator modules are matched according to some embodiments of the disclosure.

Referring to FIG. 7, in some embodiments, in the first direction Z, the three-phase armature windings arranged in the first protrusion 12 and the three-phase armature windings arranged in the second protrusion 14 are both distributed in one layer, and at least one complete three-phase armature winding is arranged in each of the first protrusion 12 and the second protrusion 14. In the first direction Z, the orthographic projections of the in-phase armature coils 13 in the first protrusion 12 and the second protrusion 14 at least partly coincide, that is, the armature coils 13 in the first protrusion 12 and the armature coils 13 in the second protrusion 14 at least partly together form at least one three-phase armature winding. In the embodiments, by defining the arrangement structure of the armature coils 13 in the first protrusion 12 and the second protrusion 14, the two adjacent armature windings 11 may still generate current excitation at the joint to drive the mover module 3 to move at the joint, so as to improve the control accuracy and kinematic accuracy of the mover module 3 at the joint, so that the mover module 3 has higher repeated positioning accuracy on the overall conveyor system 100.

Figure 8:
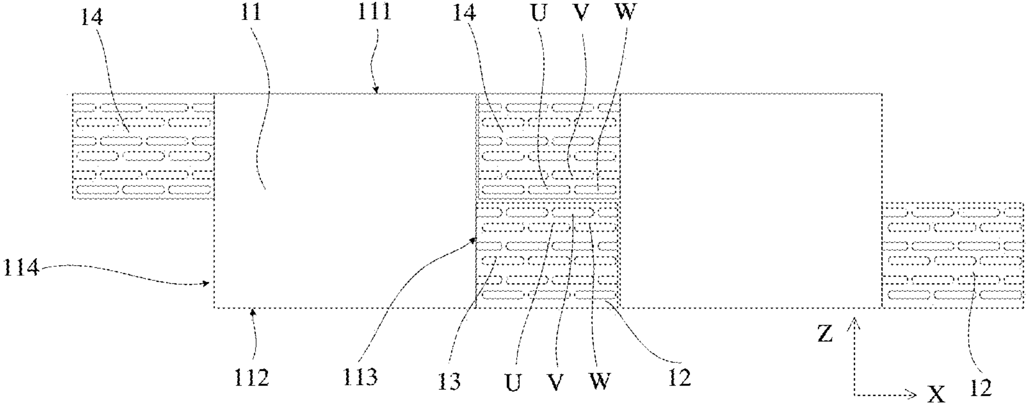
FIG. 8 is a partial sectional schematic structural diagram when two adjacent stator modules are matched according to other embodiments of the disclosure.

Referring to FIG. 8, in some embodiments, in the first direction Z, the three-phase armature windings arranged in the first protrusion 12 may be distributed in two layers, and at least one complete three-phase armature winding is arranged in each of the first protrusion 12 and the second protrusion 14. In the first direction Z, the orthographic projections of the in-phase armature coils 13 in the first protrusion 12 and the second protrusion 14 at least partly coincide, that is, the armature coils 13 in the first protrusion 12 and the armature coils 13 in the second protrusion 14 are arranged periodically in the first direction Z. In the embodiments, by defining the arrangement structure of the armature coils 13 in the first protrusion 12 and the second protrusion 14, the two adjacent armature windings 11 may still achieve the stacking of the three-phase armature windings at the joint, and then the mover module 3 may still be driven by current excitation at the joint, thereby improving the control accuracy and kinematic accuracy of the mover module 3 at the joint, and improving the repeated positioning accuracy of the mover module 3 on the overall conveyor system 100.

Further, in some embodiments, the three-phase armature windings arranged in the first protrusion 12 may be distributed in two layers, the number of layers of the armature coils 13 arranged in the first protrusion 12 and the number of layers of the coil windings arranged in the second protrusion 14 are both one, and the two layers of the armature coils 13 where the first protrusion 12 and the second protrusion 14 are close to each other are stacked together to form the three-phase armature winding. In the embodiments, by defining the arrangement structure of the armature coils 13 in the first protrusion 12 and the second protrusion 14, when the armature coils 13 in the two protrusions are individually energized, the armature coils 13 in the protrusions may not generate the magnetic field. Only when the armature coils 13 in the two protrusions are periodically energized at the same time, the armature coils 13 in the two protrusions together form a three-phase armature winding, and the three-phase armature winding may generate current excitation so as to generate a thrust to the mover module 3 located at the joint, thereby enabling the mover module 3 to be driven by the current excitation at the joint, increasing the control accuracy and kinematic accuracy of the mover module 3 at the joint, and improving the repeated positioning accuracy of the mover module 3 on the overall conveyor system 100.

Still further, in some embodiments, the three-phase armature windings arranged in the first protrusion 12 may be distributed in two layers, at least one complete three-phase armature winding is arranged in at least one of the first protrusion 12 and the second protrusion 14, and for the joint of the first protrusion 12 and the second protrusion 14, two layers of adjacent armature coils 13 of the first protrusion 12 and the second protrusion 14 may be stacked together to form the three-phase armature winding. It is understandable that, in the embodiments, only one single protrusion is provided with the complete three-phase armature winding, and when this protrusion is periodically energized, the three-phase armature winding of this protrusion generates current excitation to push the mover module 3 to move at the joint. Further, when the two protrusions are periodically energized at the same time, part of the armature coils 13 in the first protrusion 12 and the second protrusion 14 together form at least one three-phase armature winding, so that the mover module 3 has greater thrust at the joint, thereby increasing the control accuracy and kinematic accuracy of the mover module 3 at the joint, and improving the repeated positioning accuracy of the mover module 3 on the overall conveyor system 100.

Figure 9:
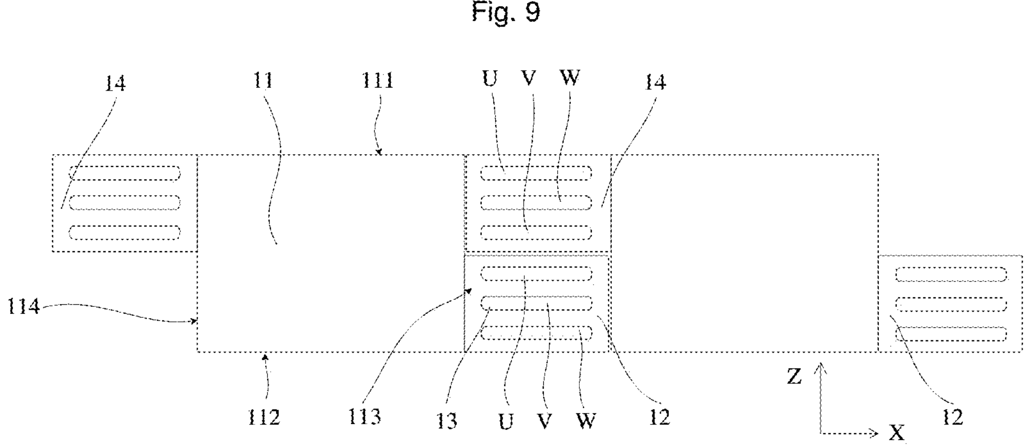
FIG. 9 is a partial sectional schematic structural diagram when two adjacent stator modules are matched according to still other embodiments of the disclosure.

In some embodiments, referring to FIG. 9, in the first direction Z, the three-phase armature windings arranged in the first protrusion 12 may be distributed in three layers, and at least one complete three-phase armature winding is arranged in each of the first protrusion 12 and the second protrusion 14. In the first direction Z, the orthographic projection of the armature coils 13 in the first protrusion 12 coincides with the orthographic projection of the in-phase armature coils 13 in the second protrusion 14, that is, the armature coils 13 in the first protrusion 12 and the armature coils 13 in the second protrusion 14 are arranged periodically in the first direction Z. In the embodiments, by defining the arrangement structure of the armature coils 13 in the first protrusion 12 and the second protrusion 14, the two adjacent armature windings 11 may achieve the stacking of the three-phase armature windings at the joint, and then the mover module 3 may be driven by current excitation at the joint, thereby improving the control accuracy and kinematic accuracy of the mover module 3 at the joint, and improving the repeated positioning accuracy of the mover module 3 on the overall conveyor system 100.

Still further, in some embodiments, the three-phase armature windings arranged in the first protrusion 12 may be distributed in three layers, at least one complete three-phase armature winding is arranged in at least one of the first protrusion 12 and the second protrusion 14, and for the joint of the first protrusion 12 and the second protrusion 14, the adjacent armature coils 13 of the first protrusion 12 and the second protrusion 14 may be stacked together to form the three-phase armature winding. It is understandable that, in the embodiments, only one single protrusion is provided with the complete three-phase armature winding, and when this protrusion is periodically energized, the three-phase armature winding of this protrusion generates current excitation to push the mover module 3 to move at the joint. Further, when the two protrusions are periodically energized at the same time, part of the armature coils 13 in the first protrusion 12 and the second protrusion 14 together form at least one three-phase armature winding, so that the mover module 3 has greater thrust at the joint, thereby increasing the control accuracy and kinematic accuracy of the mover module 3 at the joint, and improving the repeated positioning accuracy of the mover module 3 on the overall conveyor system 100.

In conjunction with FIGS. 6 to 9, it is understandable that, in order to increase the thrust of the armature winding 11 on the mover module 3, in some embodiments, the armature winding 11 includes the plurality of U-phase armature coils, the plurality of V-phase armature coils and the plurality of W-phase armature coils, the U-phase armature coils, V-phase armature coils and W-phase armature coils together forming the plurality of three-phase armature windings. The arrangement structure of the armature coils 13 is not specifically limited in the disclosure, and the armature coils 13 may be coreless coils or iron-core coils. In the first direction Z, the armature winding 11 is stacked by a plurality of layers of armature coils 13, so that the energized armature winding 11 may generate greater thrust to the mover module 3. In the second direction X, the armature coils 13 of each layer are periodically arranged in phase sequence, so that the stator module 1 has a longer length in the second direction X, and thus the single stator module 1 may have a longer driving distance to the mover module 3.

Referring to FIGS. 2 and 6, for each stator module 1, the first protrusion 12 is provided with a first upper surface 121 and a first lower surface 122 which are oppositely arranged in the first direction Z, and the first upper surface 121 of the first protrusion 12 may be co-planar with the upper surface 111 of the armature winding 11. The second protrusion 14 is provided with a second upper surface 141 and a second lower surface 142 which are oppositely arranged in the first direction Z, and the second lower surface 142 of the second protrusion 14 may be co-planar with the lower surface 112 of the armature winding 11, thereby facilitating the movement of the mover module 3 along the stator module 1.

It is understandable that the first upper surface 121 of the first protrusion 12 is co-planar with the upper surface 111 of the stator module 1, so that the space occupancy of the armature coil 13 in the armature winding 11 may be increased, and the continuity of the arrangement of the armature coil 13 in the armature winding 11 is ensured. Furthermore, the arrangement between the mover module 3 and the armature winding 11 is closer, thereby increasing the thrust between the stator module 1 and the mover module 3. Similarly, the second lower surface 142 of the second protrusion 14 is co-planar with the lower surface 112 of the stator module 1, which will not be elaborated here.

In a third direction Y perpendicular to the first direction Z and the second direction X, the widths of the first protrusion 12 and the second protrusion 14 may be the same as the width of the armature winding 11, that is, in the third direction Y, two side surfaces of the first protrusion 12 may be flush with two side surfaces of the armature winding 11, and two side surfaces of the second protrusion 14 may be flush with two side surfaces of the armature winding 11.

For each stator module 1, the first lower surface 122 of the first protrusion 12 may be co-planar with the second upper surface 141 of the second protrusion 14, and when the two stator modules 1 are spliced, the first lower surface 122 of the first protrusion 12 of one stator module 1 is attached to the second upper surface 141 of the second protrusion 14 of the other stator module 1. This structure may increase the splicing accuracy between the two adjacent stator modules 1 and facilitate the installation of the two adjacent stator modules 1. In addition, the increase of the splicing accuracy between two adjacent stator modules 1 may also improve the control accuracy and kinematic accuracy of the mover module 3, and improve the repeated positioning accuracy of the mover module 3 on the overall conveyor system 100.

Or, the first lower surface 122 of the first protrusion 12 of one stator module 1 may be parallel to the second upper surface 141 of the second protrusion 14 of the other stator module 1, and the first lower surface 122 and the second upper surface 141 are spaced apart by a preset distance, the preset distance being 0.1 mm-1 mm. By the above-mentioned attached arrangement or arrangement at a preset distance, the first protrusion 12 and the second protrusion 14 which are spliced are matched tightly, so that the control accuracy of the mover module 3 is higher.

For each stator module 1, in the first direction Z, the thicknesses of the first protrusion 12 and the second protrusion 14 may be the same or may be different; the lengths of the first protrusion 12 and the second protrusion 14 may be the same or may be different; and the widths of the first protrusion 12 and the second protrusion 14 may be the same or different. In the first direction Z, the thickness of the armature winding 11 may be equal to the sum of the thicknesses of the first protrusion 12 and the second protrusion 14, of course, the sum of the thicknesses of the first protrusion 12 and the second protrusion 14 may also be smaller than the thickness of the armature winding 11. In a specific structure, in order to facilitate the manufacturing of the stator module 1 and reduce the manufacturing cost of the stator module 1, the first protrusion 12 and the second protrusion 14 are of the same structure.

Referring to FIG. 6, in some embodiments, for two stator modules 1 spliced in the second direction X, the first protrusion 12 of one stator module 1 is spliced with the second protrusion 14 of the other stator module 1, and at least part of the armature coils 13 in the first protrusion 12 and at least part of the armature coils 13 in the second protrusion 14 are stacked together to form at least one three-phase armature winding. Exemplarily, as shown in FIGS. 7 to 9, one protrusion may be provided with the U-phase armature coil and the W-phase armature coil, the other protrusion may be provided with the V-phase armature coil, and the V-phase armature coil is located above or below the U-phase armature coil and the W-phase armature coil in the first direction Z. When the two stator modules 1 are spliced, the U-phase armature coil and the W-phase armature coil which are arranged in one protrusion and the V-phase armature coil arranged in the other protrusion form the three-phase armature winding.

In some embodiments, for two stator modules 1 spliced in the second direction X, the corresponding protrusions of the two stator modules 1 are stacked in the first direction Z, each protrusion is provided with a plurality of layers of armature coils 13 distributed in the first direction Z, each layer of armature coils 13 may include a plurality of armature coils 13 arranged periodically in preset UVW phase sequence, and each layer includes one or more U-phase armature coils, V-phase armature coils and W-phase armature coils. After the two stator modules 1 are spliced, the U-phase armature coil and the W-phase armature coil located in the same layer and the V-phase armature coil located in the adjacent layer form the three-phase armature winding. In an exemplary structure, each of the linear stator module 1 and the arc stator module 1 may include two layers of stacked armature coils 13. The armature coils 13 of the linear stator module may be in the shape of a square ring, and the armature coil 13 of the arc stator module may be in the shape of a sector ring.

Figure 10:
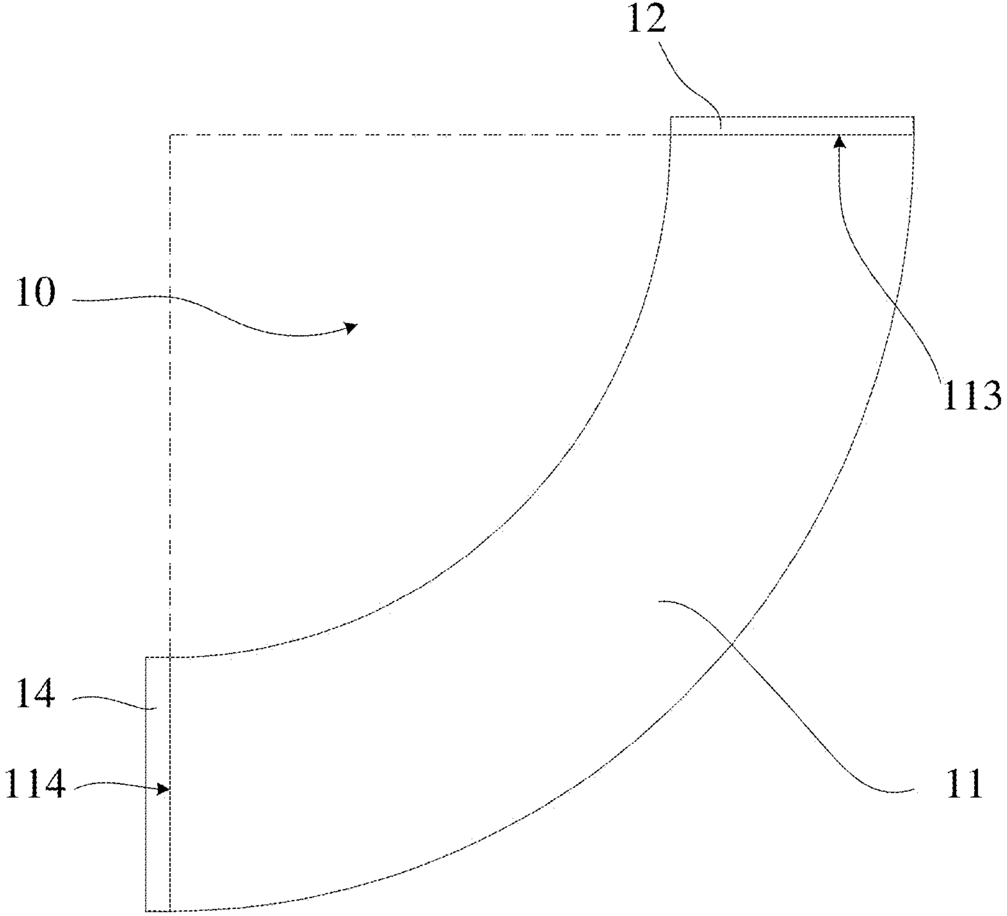
FIG. 10 is a schematic structural diagram of an arc stator module according to some embodiments of the disclosure.

As shown in FIG. 10, in some embodiments, the stator body 10 may be fan-shaped, the armature winding 11 may be arc-shaped, a plane where the first splicing surface 113 of the armature winding 11 is located is perpendicular to a plane where the second splicing surface 114 is located, the first protrusion 12 protrudes from the first splicing surface 113, and the second protrusion 14 protrudes from the second splicing surface 114, that is, equivalent to protruding a certain length from the first splicing surface 113 and the second splicing surface 114 to form the first protrusion 12 and the second protrusion 14, so that when the mover module 3 runs to the protrusion, the armature coils 13 at the joint may still be continuous, and thus the mover module 3 may be better controlled, and operations such as identifying the position of the mover module 3 and controlling the speed of the mover module 3 may be performed. The structure has an advantage that the two protrusions at the joint are more tightly spliced.

Figure 11:
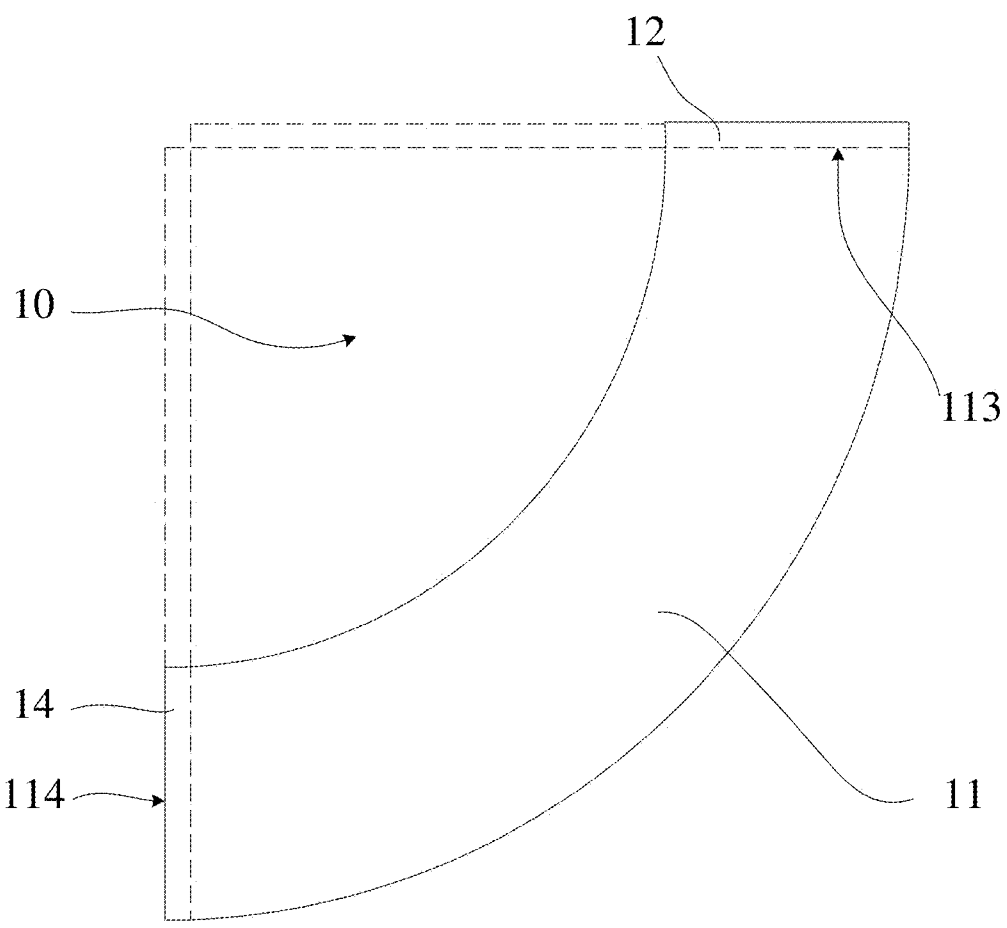
FIG. 11 is a schematic structural diagram of an arc stator module according to other embodiments of the disclosure.

As shown in FIG. 11, in some embodiments, the armature winding 11 may be arc-shaped, exemplarily, the whole armature winding 11 is a sector of 90 degrees, one end of the fan-shaped armature winding 11 may be cut, and the other end of the fan-shaped armature winding 11 may be added, so that the second protrusion 14 and the first protrusion 12 are respectively formed at the cut and added positions, that is, a plane where an end surface of the first protrusion 12 is located is perpendicular to a plane where an end surface of the second protrusion 14 is located. In an exemplary structure, in conjunction with FIG. 7, the U-phase armature coil at the leftmost side of the first layer of armature coils 13 is arranged in the protrusion, so that when the mover module 3 runs to the protrusion of the stator module 1 (namely, the U-phase armature coil), on the one hand, the protrusion of the arc stator module is mostly coupled with the protrusion of the linear stator module, and the coupling of the armature coils 13 may still be ensured at the joint, and on the other hand, only the single-phase armature coil 13 is arranged in the protrusion, compared with a multi-phase armature coils 13 in the protrusion, the setup cost of the arc stator module may be reduced. An included angle between the plane where the end surface of the protrusion is located and the plane where the corresponding splicing surface is located may be 1°-2°.

Figure 12:
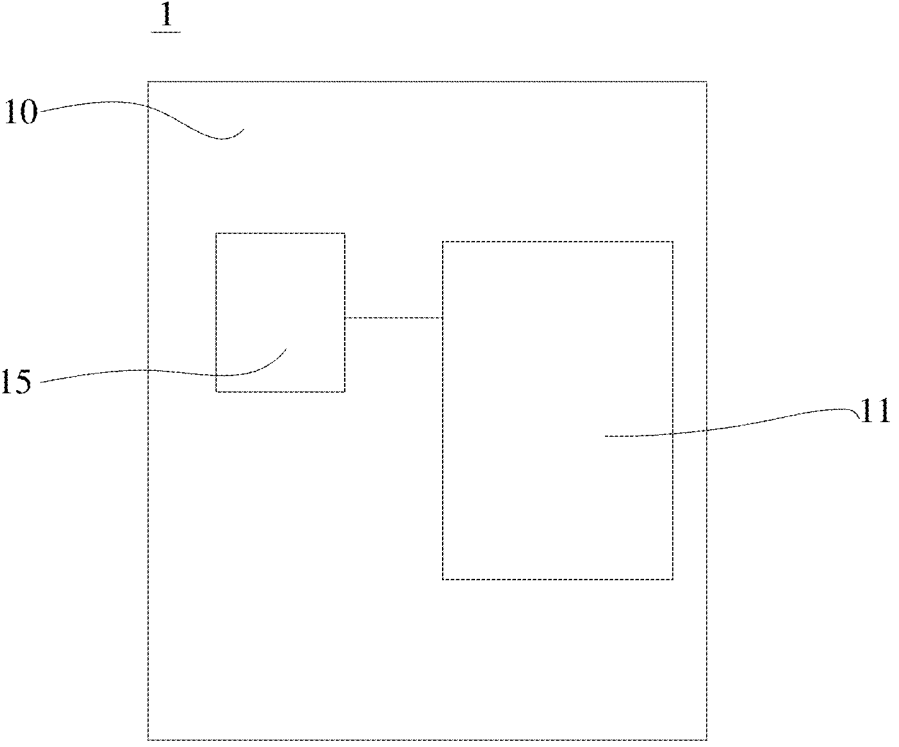
FIG. 12 is a schematic diagram of an armature winding connection according to some embodiments of the disclosure.

As shown in FIG. 12, further, in some embodiments, the stator module 1 further includes a first driver 15. The first driver 15 is arranged on the stator body 10 and electrically connected with the armature winding 11. The first driver 15 is configured to drive and control the periodic energization of the armature coils 13 in the armature winding 11. The first driver 15 may be a circuit element such as a Microcontroller Unit (MCU), a circuit board, a power supply, etc. When the first driver 15 is the MCU or circuit board or power supply, an electrical connection between the first driver 15 and the armature winding 11 may be at least one of a wire connection, a plug connection, and welding. Specifically, a direct electrical connection may be achieved between the first driver 15 and the armature winding 11 through a wire; or, plug-and-play may be achieved between the first driver 15 and the armature winding 11 through a plug interface to facilitate disassembly and replacement of the first driver and the armature winding 11. For another example, the first driver 15 and the armature winding 11 are directly welded to achieve an integrated structure, and this integrated structure is easy to achieve the miniaturization of the stator module 1, and makes the driving of the armature winding 11 by the first driver 15 more stable.

Or, in some embodiments, the first driver 15 is printed with the armature coils 13. That is, the first driver 15 may be a circuit board with an MCU. One or more layers of armature coils 13 are printed on the circuit board, and the armature coils 13 may be printed in any of the above-mentioned arrangement modes of the three-phase armature windings described above. In the embodiments, the first driver 15 and the armature winding 11 are integrated by printing the armature coils 13 on the circuit board, which may increase the response speed between the first driver 15 and the armature winding 11. Or, the first driver 15 may also be an integrated circuit board. Various types of electric components are integrated on the integrated circuit board. The integrated circuit board controls the energization and de-energization of the armature winding by transmitting control signals and electrical energy to the integrated circuit board. When the first driver 15 is printed with the armature coils 13, the first driver 15 may be a PCB winding to facilitate the installation between the first driver 15 and the stator body 10.

Further, there are plurality of first drivers 15 printed with the armature coils 13, and the plurality of first drivers 15 together form the armature winding 11. For example, the plurality of layers of the first drivers 15 are stacked in the first direction Z so as to increase the thickness of the armature winding 11 in the first direction Z, thereby increasing the driving force after the armature winding 11 is energized, and the thickness of the armature winding 11 in the first direction Z is controlled by controlling the number of first drivers 15 stacked in the first direction Z, so that the armature winding 11 may select a suitable thickness according to a working condition or according to the type of the mover module 3, thereby increasing the universality and flexibility of arrangement of the stator module 1. Or, the plurality of layers of the first drivers 15 are stacked in the second direction X so as to increase the length of the armature winding 11 in the second direction X, thereby increasing the driving length of the stator module 1 to the mover module 3. It is understandable that, the driving distance of the armature winding 11 to the mover module 3 is changed by controlling the number of first drivers 15 stacked in the second direction X, so that the armature winding 11 may select a suitable length according to the working condition or the type of the mover module 3, thereby increasing the universality and flexibility of arrangement of the stator module 1. For another example, in some embodiments, the apparent shape of the armature winding 11 is changed by simultaneously changing the number of first drivers 15 stacked in the first direction Z and the second direction X. It is understandable that, in the embodiments, the plurality of first drivers 15 are stacked to form the armature winding 11, which may facilitate manufacturing of the armature winding 11, facilitate integration of the armature winding 11, and makes the connection between the armature winding 11 and the stator body 10 more convenient and stable.

Figure 13:
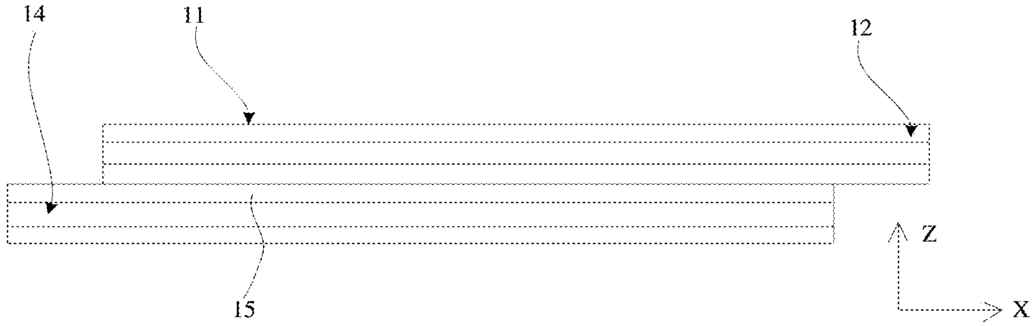
FIG. 13 is a sectional schematic structural diagram of an arrangement structure of a first driver according to some embodiments of the disclosure.
Figure 14:
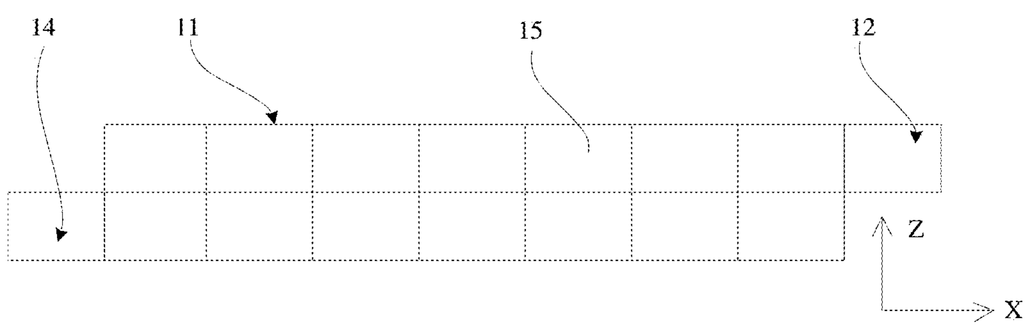
FIG. 14 is a sectional schematic structural diagram of an arrangement structure of a first driver according to other embodiments of the disclosure.

It is understandable that, by designing the number or structure of the first drivers 15 located in different layers, the first driver 15 in one layer protrudes in the second direction X compared to the first driver 15 in the adjacent layer, thereby forming the first protrusion 12 and the second protrusion 14. Further, on the basis of stacking the first drivers 15 in the first direction Z, referring to FIG. 13, in some embodiments, the first drivers 15 having the same appearance structure may be staggered in the second direction X, so that one end of one first driver 15 protrudes compared to the same end of the other first driver 15, thereby forming the first protrusion 12 and the second protrusion 14. Or, in other embodiments, the first drivers 15 having different appearance structures may be staggered in the second direction X, and one ends of the first drivers 15 are all located at the same arrangement reference, and the first protrusion 12 and/or the second protrusion 14 are/is formed according to the difference in the structures of the first drivers 15 themselves. For another example, referring to FIG. 14, on the basis of forming a regular plate-like structure by the first drivers 15 having the same appearance structure, additional first drivers 15 are stacked on both sides of the regular plate-like structure, so that the additionally stacked first drivers 15 form the first protrusion 12 and/or the second protrusion 14. It is understandable that the coil structures in the additionally stacked first drivers 15 may be the same as or different from the coil structures of the first drivers 15 in the regular plate-like structure.

Further, a cooling fin may also be arranged between the plurality of layers of the stacked first drivers 15, so that heat generated after the coils are energized is rapidly dissipated through the cooling fin, thereby avoiding negative effects such as burning the circuit due to overheating of the coils. The specific structure and material of the cooling fin are not limited in the embodiments, and the cooling fin may be made of aluminum, copper or the like.

Figure 15:
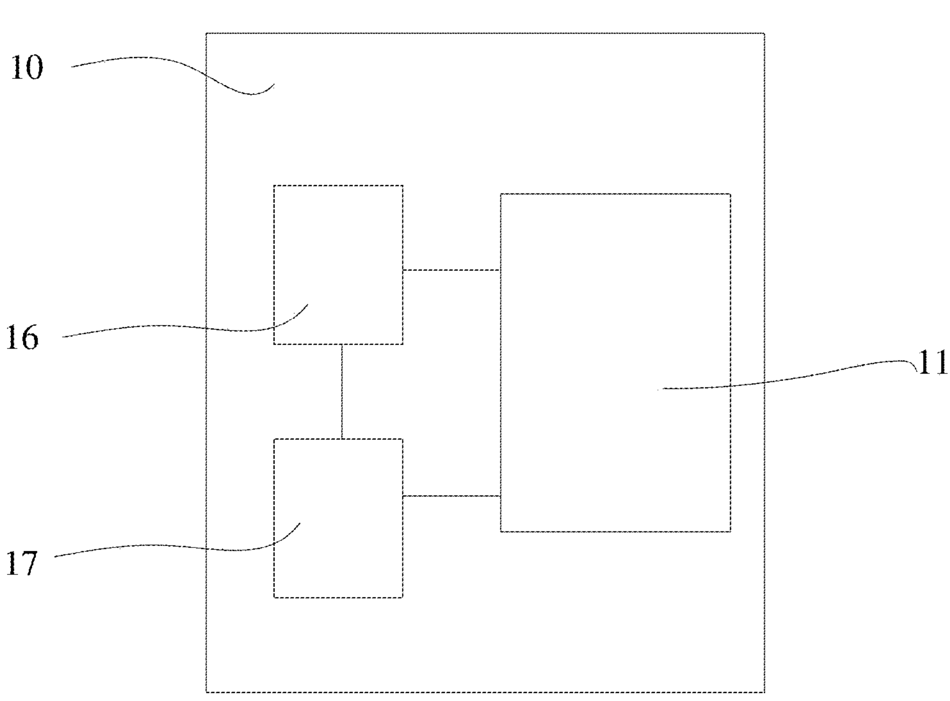
FIG. 15 is a schematic diagram of an armature winding connection according to other embodiments of the disclosure.
Figure 16:
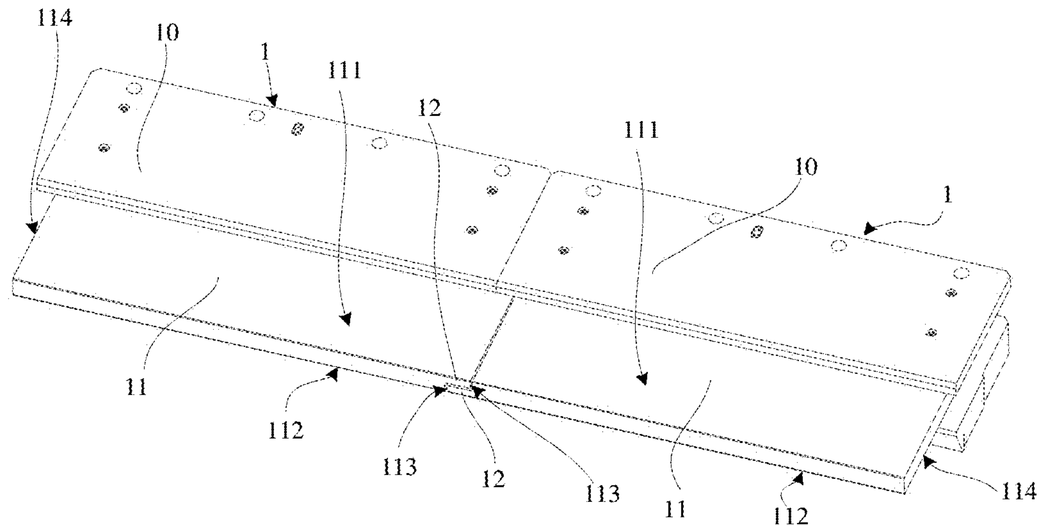
FIG. 16 is a schematic structural diagram when two adjacent stator modules are spliced in a conveyor system according to some embodiments of the disclosure.
Figure 17:
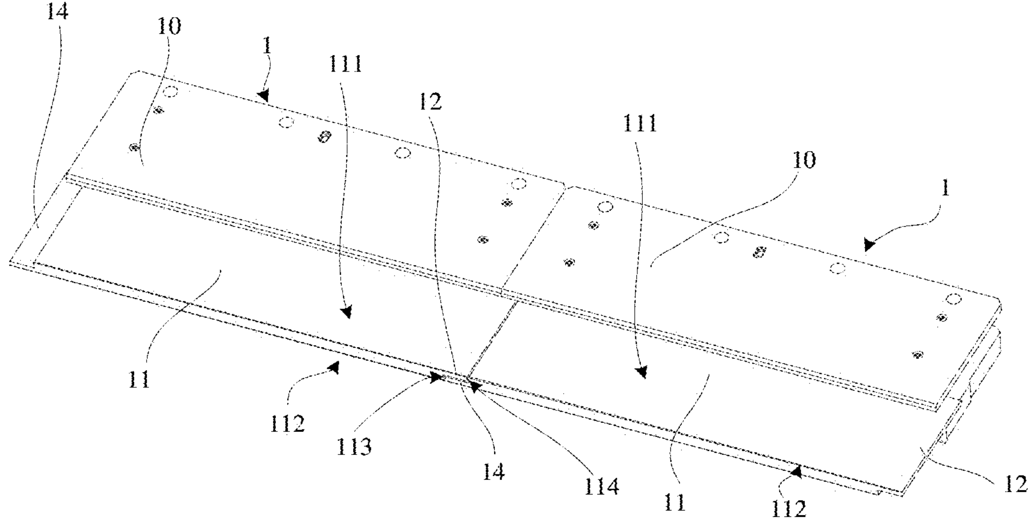
FIG. 17 is a schematic structural diagram when two adjacent stator modules are spliced in a conveyor system according to other embodiments of the disclosure.
Figure 18:
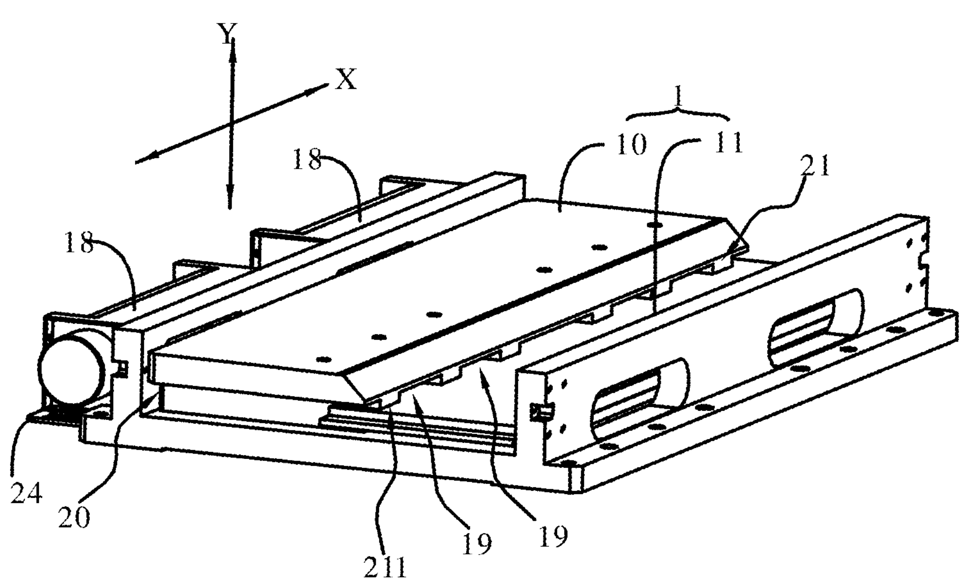
FIG. 18 is a schematic structural diagram of a stator module according to an embodiment of the disclosure.
Figure 19:
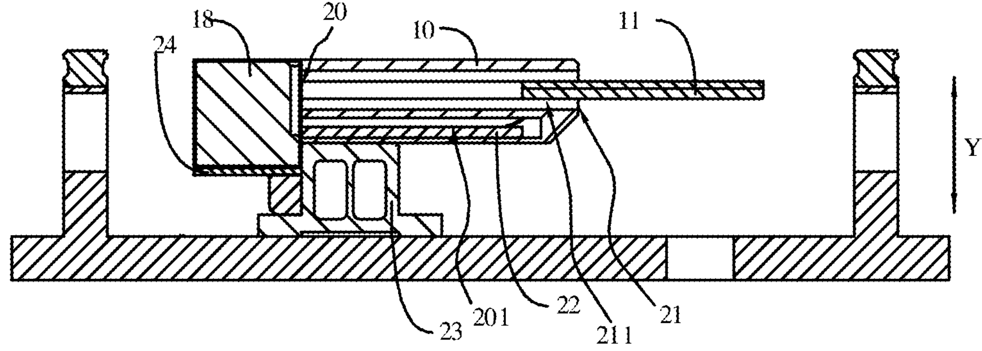
FIG. 19 is a sectional schematic structural diagram of a stator module according to an embodiment of the disclosure.
Figure 20:
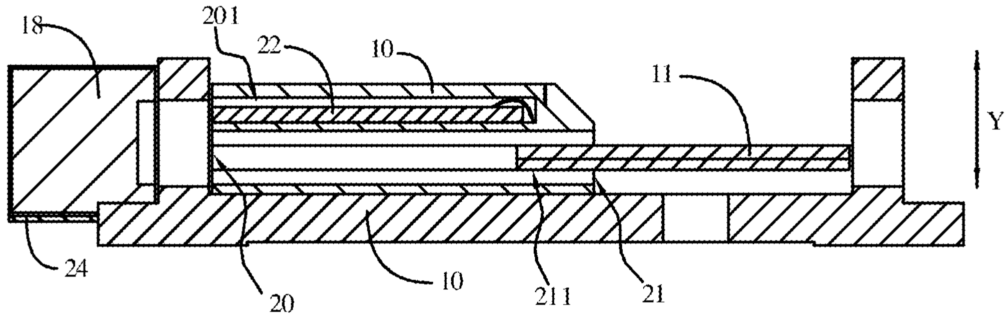
FIG. 20 is a sectional schematic structural diagram of a stator body according to another embodiment of the disclosure.
Figure 21:
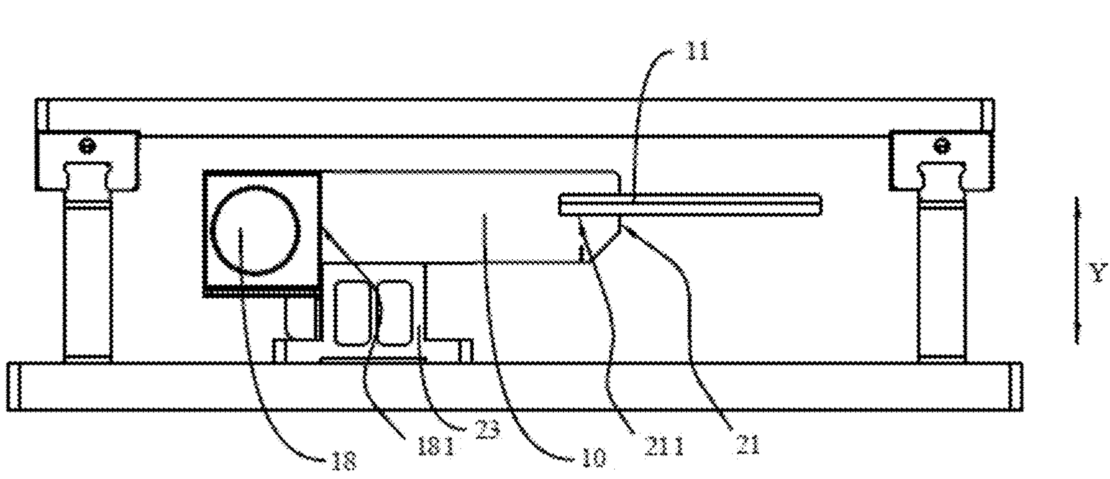
FIG. 21 is a schematic structural diagram of a conveyor system according to an embodiment of the disclosure.

Referring to FIG. 15, in some embodiments, the stator module 1 includes a second driver 16 and a third driver 17. The second driver 16 and the third driver 17 are both fixedly arranged on the stator body 10, the second driver 16 is electrically connected with the third driver 17, and the third driver 17 is printed with the armature coils 13. Both the second driver 16 and the third driver 17 may control the periodic energization of the armature coils 13, so that the armature winding 11 generates current excitation, and therefore the stator module 1 may push the mover module 3 to move.

Specifically, the specific structures of the second driver 16 and the third driver 17 are not limited in the embodiments. For example, both the second driver 16 and the third driver 17 may be MCUs. The MCU in the second driver 16 is a master control chip, and after the master control chip receives a signal, the MCU in the second driver 16 sends the signal to the MCU in the third driver 17, and the MCU in the third driver 17 controls the periodic energization of the armature coils 13. When a plurality of third drivers 17 are arranged, the MCU in the second driver 16 sends signals to the MCUs in the third drivers 17 orderly, and the MCUs in the third drivers 17 control the periodic energization of the armature coil 13. Or, the second driver 16 may be the power supply, and the third driver 17 may be the MCU. The second driver 16 delivers electric energy to the MCU, and the MCU converts the electric energy into the excitation current to be supplied to the armature coils 13. It is understandable that the number of the third drivers 17 is not limited in the embodiments, and the number of the third drivers 17 may be one or more. For example, the number of third drivers 17 may be one, at this time, the plurality of armature coils 13 printed on the third driver 17 together form the armature winding 11. For another example, the number of third drivers 17 may be plural, and the armature coils 13 printed on the plurality of third drivers 17 together form the armature winding 11. In summary, both the second driver 16 and the third driver 17 may be at least one of the circuit board, the MCU, or the power supply, the second driver 16 is electrically connected with the third driver 17 to control the armature winding 11 to generate current excitation. An electrical connection mode between the second driver 16 and the third driver 17 includes at least one of a wire connection, a plug connection, welding, a flexible circuit board connection, or an electromagnetic coupling connection. These connection modes are conventional connection modes, which will not be elaborated here.

In some embodiments, at least one of the second driver 16 and the third driver 17 is the integrated circuit board. Various types of electric components are integrated on the integrated circuit board. By transmitting control signals and electrical energy to the integrated circuit board, the integrated circuit board is controlled step by step to achieve the energization and de-energization of the armature winding. When the third driver 17 is printed with the armature coils 13, the third driver 17 may be the PCB winding to facilitate the installation between the third driver 17 and the stator body 10.

Further, the number of layers of the armature coils 13 printed on the third driver 17 is not limited in the embodiments, and the number of layers of the armature coils 13 printed on the third driver 17 may be one or more. Specifically, when the three-phase armature windings are arranged in a single layer, the armature coils 13 printed on the third driver 17 are arranged at intervals in UVW phase sequence in the second direction X, and the number of layers of the armature coils 13 printed on the third driver 17 may be one or more. When the three-phase armature windings are distributed in two layers, the number of layers of the armature coils 13 printed on the third driver 17 may be one, and the plurality of third drivers 17 are stacked, so that the armature coils 13 in the two adjacent third drivers 17 together form the three-phase armature winding. When the three-phase armature windings are distributed in two layers, the number of layers of the armature coils 13 printed on the third driver 17 may be plural, that is, at least one three-phase armature winding is arranged in the third driver 17, and the armature coils 13 on at least two adjacent third drivers 17 may together form the three-phase armature winding. When the three-phase armature windings are distributed in three layers, the number of layers of the armature coils 13 printed on the third driver 17 may be one, and the plurality of third drivers 17 are stacked, so that the armature coils 13 in the two adjacent third drivers 17 together form the three-phase armature winding. When the three-phase armature windings are distributed in three layers, the number of layers of the armature coils 13 printed on the third driver 17 may be plural, that is, at least one three-phase armature winding is arranged in the third driver 17, and the armature coils 13 on at least three adjacent third drivers 17 may together form the three-phase armature winding.

Further, when the third driver 17 is printed with the armature coils 13, the number of third drivers 17 may be plural, and the plurality of third drivers 17 together form the armature winding 11. For example, the plurality of layers of the third drivers 17 are stacked in the first direction Z so as to increase the thickness of the armature winding 11 in the first direction Z, thereby increasing the driving force after the armature winding 11 is energized, and the thickness of the armature winding 11 in the first direction Z is controlled by controlling the number of third drivers 17 stacked in the first direction Z, so that the armature winding 11 may select a suitable thickness according to a working condition or according to the type of the mover module 3, thereby increasing the universality and flexibility of arrangement of the stator module 1. Or, the plurality of layers of the third drivers 17 are stacked in the second direction X so as to increase the length of the armature winding 11 in the second direction X, thereby increasing the driving length of the stator module 1 to the mover module 3. It is understandable that, the driving distance of the armature winding 11 to the mover module 3 is changed by controlling the number of third drivers 17 stacked in the second direction X, so that the armature winding 11 may select a suitable length according to the working condition or the type of the mover module 3, thereby increasing the universality and flexibility of arrangement of the stator module 1. For another example, in some embodiments, the apparent shape of the armature winding 11 is changed by simultaneously changing the number of third drivers 17 stacked in the first direction Z and the second direction X. It is understandable that, in the embodiments, the plurality of third drivers 17 are stacked to form the armature winding 11, which may facilitate the manufacturing of the armature winding 11, facilitate the integration of the armature winding 11, and makes the connection between the armature winding 11 and the stator body 10 more convenient and stable.

It is understandable that, by designing the number or structure of the third drivers 17 located in different layers, the third driver 17 in one layer protrudes in the second direction X compared to the third driver 17 in the adjacent layer, thereby forming the first protrusion 12 and the second protrusion 14. In some embodiments, the third drivers 17 having the same appearance structure may be staggered in the second direction X, so that one end of one third driver 17 protrudes compared to the same end of the other third driver 17, thereby forming the first protrusion 12 and the second protrusion 14. Or, in other embodiments, the third drivers 17 having different appearance structures may be staggered in the second direction X, and one ends of the third drivers 17 are all located at the same arrangement reference, and the first protrusion 12 and/or the second protrusion 14 are/is formed according to the difference in the structures of the third drivers 17 themselves. For another example, on the basis of forming a regular plate-like structure by the third drivers 17 having the same appearance structure, additional third drivers 17 are stacked on two sides of the regular plate-like structure, so that additionally stacked third drivers 17 form the first protrusion 12 and/or the second protrusion 14. It is understandable that the coil structures in the additionally stacked third drivers 17 may be the same as or different from the coil structures of the third drivers 17 in the regular plate-like structure. Further, a cooling fin may also be arranged between the plurality of layers of the stacked third drivers 17, so that heat generated after the coils are energized is rapidly dissipated through the cooling fin, thereby avoiding negative effects such as burning the circuit due to overheating of the coils. The specific structure and material of the cooling fin are not limited in the embodiments, and the cooling fin may be made of aluminum, copper or the like.

It is understandable that the second driver 16 and/or the third driver 17 described above controls the periodic energization of the armature coils 13. The armature coils 13 mean not only the armature coils 13 arranged in the armature winding 11 but also the armature coils 13 arranged in the first protrusion 12 and/or the second protrusion 14.

It is understandable that the stator module 1 described in FIGS. 12 to 15 may be either the linear stator module or the arc stator module.

Referring to FIGS. 18 to 21, the stator module 1 further includes a cooling fan 18. The cooling fan 18 is installed on the stator body 10, and the cooling fan 18 is provided with an air outlet 181. The armature winding 11 is arranged on a side, away from the air outlet 181, of the stator body 10, the stator body 10 is provided with an air guide channel 19 communicating with the air outlet 181, and airflow from the air outlet 181 flows through the armature winding 11 through the air guide channel 19.

The airflow from the air outlet 181 of the cooling fan 18 flows through the armature winding 11 through the air guide channel 19. When the cooling fan 18 works normally, the airflow flows out of the air outlet 181 of the cooling fan 18, and the airflow flows into the air guide channel 19 from the side, which communicates with the air outlet 181, of the air guide channel 19. The air guide channel 19 has a guiding effect on the airflow, so that the airflow flows through the armature winding 11 through the air guide channel 19, thereby dissipating the heat generated when the armature winding 11 works.

Based on the stator module 1 in the embodiments of the disclosure, the airflow from the air outlet 181 of the cooling fan 18 flows through the armature winding 11 through the air guide channel 19 under the guiding effect of the air guide channel 19, so that the heat generated when the armature winding 11 works may be effectively dissipated, the heat accumulation on the armature winding 11 may be effectively avoided, a good protection function is provided for the armature winding 11, and the potential safety hazard is also reduced.

Further, considering that the stator body 10 needs to provide support for the armature winding 11 on the one hand, and needs to provide the air guide channel 19 for circulating the airflow from the air outlet 181 of the cooling fan 18 on the other hand, in order to enable the stator body 10 to have the corresponding functions, the stator body 10 is provided with a first surface 20 and a second surface 21. The first surface 20 faces the air outlet 181 of the cooling fan 18, the second surface 21 faces away from the air outlet 181 of the cooling fan 18, and the second surface 21 is provided with a groove 211 into which the armature winding 11 is partly inserted. The air guide channel 19 penetrates through the first surface 20 and the second surface 21, and the air guide channel 19 communicates with a side groove wall of the groove 211. The relative fixing of the position between the armature winding 11 and the stator body 10 may be achieved by an interference fit between the part of the armature winding 11 inserted into the groove 211 and the groove wall surface of the groove 211. Of course, the relative fixing of the position between the armature winding 11 and the stator body 10 may also be achieved by a bonding fit, such as glue or double-sided glue, between the part of the armature winding 11 inserted into the groove 211 and the groove wall surface of the groove 211. Or, the armature winding 11 may be fixed relative to the stator body 10 by screwing. The air guide channel 19 communicates with the side groove wall of the groove 211, so that the part of the armature winding 11 inserted into the groove 211 may also be in contact with the airflow flowing through the air guide channel 19, which increases the contact area between the armature winding 11 and the airflow, thereby further accelerating the heat dissipation of the armature winding 11.

As shown in FIGS. 18 to 21, further, the number of air guide channels 19 may be one or more. When the number of air guide channels 19 is plural, all the air guide channels 19 are arranged at intervals in the second direction X, and a central axis in an extension direction of each air guide channel 19 is perpendicular to the second direction X. The plurality of air guide channels 19 are designed to be arranged at intervals in the second direction X, so that as much airflow as possible from the air outlet 181 of the cooling fan 18 may be ensured to enter the air guide channels 19, and the stability of the connection between the armature winding 11 and the stator body 10 may also be ensured. The central axis in the extension direction of each air guide channel 19 is designed to be perpendicular to the second direction X, so that the extension length of each air guide channel 19 in the stator body 10 is minimized, thereby minimizing the loss of the airflow from the air outlet 181 of the cooling fan in the air guide channel 19.

As shown in FIGS. 18 to 21, further, considering that the air guide channels 19 may be arranged on a single side of the armature winding 11, in order to further accelerate the heat dissipation of the armature winding 11, in some embodiments, the air guide channels 19 are distributed on both sides of the armature winding 11 in a third direction Y, and the third direction Y is perpendicular to the second direction X. By designing the air guide channels 19 on both sides of the armature winding 11, the airflow from the air outlet 181 of the cooling fan 18 may flow through both sides of the armature winding 11 through the air guide channels 19 to dissipate the heat of the armature winding 11 from both sides, thereby further accelerating the heat dissipation of the armature winding 11.

As shown in FIGS. 18 to 21, further, considering that the energization and de-energization of the armature winding 11 needs to be controlled electrically, the stator body 10 further includes a circuit board 22. The first surface 20 is provided with a mounting groove 201, and the circuit board 22 is located in the mounting groove 201 and electrically connected with the armature winding 11. The circuit board 22 integrates electrical components such as a sensor, a controller, a transmitter, a receiver, and the like. For example, the sensor on the circuit board 22 and a sensing element of the mover module 3 may perform wireless transmission to acquire information about the movement position, movement speed, etc. of the mover module 3, and such information is transmitted to a terminal through the transmitter. The terminal sends a control instruction to the receiver according to production requirements, and the controller on the circuit board 22 may control the energization time or energization position of the armature winding 11 according to the control instruction. The circuit board 22 may be a hard circuit board 22, a soft circuit board 22, or a soft and hard bonded circuit board 22. The specific connection mode between the circuit board 22 and the groove wall surface of the mounting groove 201 is not limited herein, and for example, the circuit board 22 may be connected with the groove wall surface of the mounting groove 201 by at least one of bonding, screwing, clamping, etc. It is understandable that, the circuit board 22 also generates heat during operation, and in order to prevent heat generated when the circuit board 22 works from accumulating on the circuit board 22, by installing the circuit board 22 on the side, close to the air outlet 181 of the cooling fan 18, of the stator body 10, the airflow from the air outlet 181 of the cooling fan 18 may flow from a notch of the mounting groove 201 into the mounting groove 201 to dissipate the heat generated when the circuit board 22 works.

The stator module 1 further includes a fixed support 23, the cooling fan 18 being connected to the stator body 10 through the fixed support 23. The specific structure of the fixed support 23 is not limited herein, the fixed support 23 may be fixedly connected to the stator body 10 by screwing or welding, and the fixed support 23 may be provided with a lightening hole under the condition that the structural strength of the fixed support 23 is sufficient. The cooling fan 18 may be fixedly connected to the fixed support 23 by screwing, and the stator body 10 may be fixedly connected with the fixed support 23 by bonding or screwing. By designing the fixed support 23, the fixed support 23 serves as an intermediate connection structure between the cooling fan 18 and the stator body 10, so that there is an air space between the cooling fan 18 and the stator body 10, which increases the heat dissipation area of the cooling fan 18, and reduces the heat accumulated on the cooling fan 18 when the cooling fan 18 works.

In order to accelerate the heat dissipation of the cooling fan 18, the stator module 1 further includes a cooling panel 24, the cooling panel 24 being arranged at a bottom of the cooling fan 18, and the cooling fan 18 being connected to the fixed support 23 through the cooling panel 24. The cooling panel 24 should be made of a material with good thermal conductivity, for example, the material for preparing the cooling panel 24 may be, but not limited to, a thermal conductive material such as thermal conductive silicone grease, heat dissipation silicone grease, and graphene. By arranging the cooling panel 24 at the bottom of the cooling fan 18, on the one hand, the cooling panel 24 provides good support for the cooling fan 18, and on the other hand, the cooling panel 24 may accelerate a rate of transferring the heat generated when the cooling fan 18 works to the fixed support 23, thereby accelerating the heat dissipation of the cooling fan 18.

In conjunction with FIGS. 3 to 5, 16 and 22, in a second aspect, the embodiments of the disclosure provide a conveyor system 100, which includes a base 2, a plurality of mover modules 3, a guide rail 4 and a plurality of spliced stator modules 1. The plurality of spliced stator modules 1 may constitute a linear stator segment 110 and/or an arc stator segment 120. The mover modules 3 may move on the stator modules 1 to achieve transportation of articles.

The base 2 may serve as a bearing structure of the conveyor system 100, and provides an arrangement basis for the arrangement of the guide rail 4 and the stator modules 1. The guide rail 4 is fixed to the base 2 and laid in a conveying direction. The mover module 3 is in sliding fit with the guide rail 4 and coupled with an armature winding 11.

The plurality of stator modules 1 are successively spliced in the conveying direction of the conveyor system 100. For two adjacent stator modules 1, a first protrusion 12 of one stator module 1 is spliced with the first protrusion 12 of the other stator module 1, and at least a part of armature coils 13 in the two first protrusions 12 are stacked together to form at least one three-phase armature winding. The armature winding 11 is provided with a plurality of armature coils 13 arranged periodically. The armature coils 13 include a plurality of U-phase armature coils, a plurality of V-phase armature coils and a plurality of W-phase armature coils. The plurality of armature coils 13 at different positions are periodically energized, so that the armature winding 11 generates varying magnetic fields at different positions, and the magnetic fields are configured to be coupled with permanent magnets on the mover module 3 to drive the mover module 3 to move on the stator module 1. Further, the armature winding 11 in the embodiments is provided with an upper surface 111 and a lower surface 112 which are oppositely arranged in a first direction Z, and a first splicing surface 113 and a second splicing surface 114 which are oppositely arranged in a second direction X perpendicular to the first direction Z. The first splicing surface 113 is further provided with the first protrusion 12 protruding therefrom, and at least part of the armature coils 13 are arranged in the first protrusion 12. It is understandable that the arrangement of the first protrusion 12 may facilitate the splicing between two adjacent stator modules 1, and the splicing between the two adjacent stator modules 1 may rely on the first protrusion 12 and/or the first splicing surface 113 to realize the mutual positioning of the positions, thereby increasing the splicing accuracy between the two adjacent stator modules 1, so that when the mover module 3 runs to the joint of the adjacent stator modules 1, the mover module 3 still has higher kinematic accuracy. Since part of the armature winding 11 is arranged in the first protrusion 12, the two adjacent stator modules 1 may still drive the three-phase armature winding to generate current excitation at the joint, so that the mover module 3 may still be driven at the joint of the two adjacent stator modules 1, the mover module 3 may still maintain higher control accuracy at the joint, and the mover module 3 has higher repeated positioning accuracy in the conveyor system 100.

In conjunction with FIGS. 7 to 9, 17 and 22, in some embodiments, the plurality of stator modules 1 are successively spliced in the conveying direction. The mover module 3 is in sliding fit with the guide rail 4 and coupled with the armature winding 11. Each stator module 1 includes a stator body 10 and an armature winding 11. The stator body 10 is fixedly arranged on the base 2, and the armature winding 11 is fixedly connected to the stator body 10. The arrangement structure of the armature winding 11 of each stator module 1 has been described above, and will not be elaborated here.

It is understandable that, in the conveyor system 100 in the embodiments, the armature winding 11 is provided with the plurality of armature coils 13 arranged periodically, and the armature coils 13 include the plurality of U-phase armature coils, the plurality of V-phase armature coils and the plurality of W-phase armature coils. The plurality of armature coils 13 at different positions are periodically energized, so that the armature winding 11 generates varying magnetic fields at different positions, and the magnetic fields are configured to be coupled with permanent magnets on the mover module 3 to drive the mover module 3 to move on the stator module 1. Further, the armature winding 11 in the embodiments is provided with the upper surface 111 and the lower surface 112 which are oppositely arranged in a first direction Z, and the first splicing surface 113 and the second splicing surface 114 which are oppositely arranged in a second direction X perpendicular to the first direction Z. The first splicing surface 113 is further provided with the first protrusion 12 protruding therefrom, and at least part of the armature winding 11 is arranged in the first protrusion 12. The second splicing surface 114 is further provided with a second protrusion 14 protruding therefrom, and at least part of the armature winding 11 is arranged in the second protrusion 14. It is understandable that the arrangement of the first protrusion 12 and the second protrusion 14 may facilitate the splicing between the two adjacent stator modules 1, and the splicing between the two adjacent stator modules 1 may rely on the first protrusion 12 and the second protrusion 14 to realize the mutual positioning of the positions, thereby increasing the splicing accuracy between the two adjacent stator modules 1, so that when the mover module 3 runs to the joint of the adjacent stator modules 1, the mover module 3 still has higher kinematic accuracy. Since part of the armature winding 11 is arranged in the first protrusion 12 and the second protrusion 14, the two adjacent stator modules 1 may still drive the three-phase armature winding to generate current excitation at the joint, so that the mover module 3 may still be driven at the joint of the two adjacent stator modules 1, the mover module 3 may still maintain higher control accuracy at the joint, and the mover module 3 has higher repeated positioning accuracy in the conveyor system 100.

For the two adjacent stator modules 1, the first protrusion 12 of one stator module 1 is spliced with the second protrusion 14 of the other stator module 1, and at least part of the armature coils 13 in the first protrusion 12 and at least part of the armature coils 13 in the second protrusion 14 are stacked together to form at least one three-phase armature winding. The matching structure has been described above, and will not be elaborated here. It is understandable that the splicing of the first protrusion 12 and the second protrusion 14 may increase the installation accuracy of the two adjacent stator modules 1, so as to facilitate the splicing between the adjacent stator modules 1. In addition, since the armature coils 13 are arranged in each of the first protrusion 12 and the second protrusion 14, the mover module 3 may still be excited by a current at the joint of the two adjacent armature windings 11, so as to increase the control accuracy and kinematic accuracy of the mover module 3 at the joint of the armature windings 11, so that the mover module 3 has more precise repeated positioning accuracy on the conveyor system 100.

Further, the first protrusion 12 is provided with a first upper surface 121 and a first lower surface 122 which are oppositely arranged in the first direction Z, and the first upper surface 121 is co-planar with the upper surface 111. The second protrusion 14 is provided with a second upper surface 141 and a second lower surface 142 which are oppositely arranged in the first direction Z, and the second lower surface 142 is co-planar with the lower surface 112. For the two adjacent stator modules 1, the upper surface 111 of one stator module 1 is co-planar with the upper surface

111 of the other stator module 1, the lower surface 112 of one stator module 1 is co-planar with the lower surface 112 of the other stator module 1, the first lower surface 122 of one stator module 1 is parallel to the second upper surface 141 of the other stator module 1, and a distance between the first lower surface 122 and the second upper surface 141 is 0.1 mm-1 mm. The matching structure of the first protrusion 12 and the second protrusion 14 has been described above, and will not be elaborated here. It is understandable that this structure may increase the splicing accuracy between two adjacent stator modules 1 and facilitate the installation of the two adjacent stator modules 1. In addition, the increase of the splicing accuracy between the two adjacent stator modules 1 may also improve the control accuracy and kinematic accuracy of the mover module 3, and improve the repeated positioning accuracy of the mover module 3 on the overall conveyor system 100.

Figure 22:
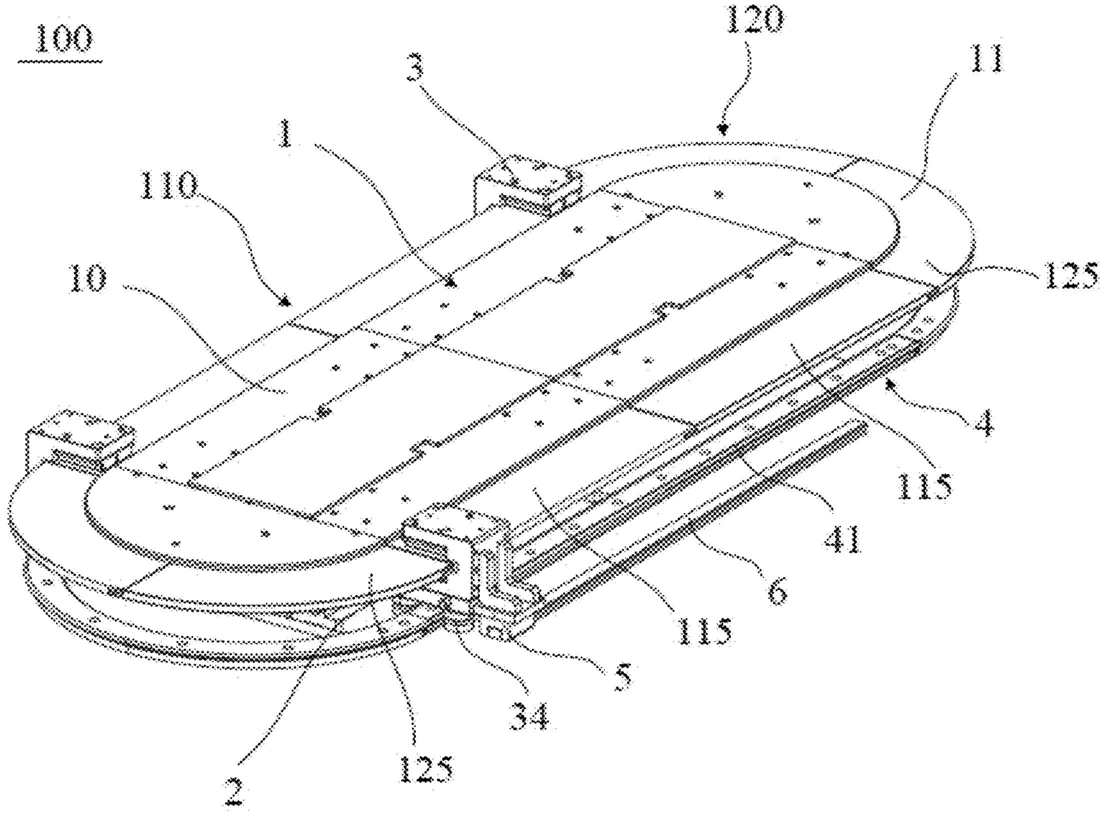
FIG. 22 is a schematic structural diagram of a conveyor system according to some embodiments of the disclosure.

Referring to FIG. 22, the conveyor system 100 of FIG. 22 is a circular line. There are two linear stator segments 110 and two arc stator segments 120. Front ends of the two linear stator segments 110 are connected through one arc stator segment 120, and rear ends of the two linear stator segments 110 are connected through the other arc stator segment 120. The linear stator segment 110 is formed by splicing the plurality of linear stator modules 1. The arc stator segment 120 is formed by splicing the plurality of fan-shaped stator modules 1. Each stator module 1 is provided with the stator body 10 and the armature winding 11. The stator body 10 is fixedly arranged on the base 2, the armature winding 11 is fixedly connected to the stator body 10, and the armature winding 11 is coupled with the mover module 3. The armature winding 11 is provided with the plurality of armature coils 13 arranged periodically, and the armature coils 13 of the armature winding 11 may form the plurality of three-phase armature windings.

The stator modules 1 located at both ends of the linear stator segment 110 are defined as first stators 115, and the stator modules 1 located at both ends of the arc stator segment 120 are defined as second stators 125. Each of the first stator 115 and the second stator 125 includes the armature winding 11 provided with the plurality of armature coils 13.

The armature winding 11 is provided with the upper surface 111 and the lower surface 112 which are oppositely arranged in the first direction Z, and the first splicing surface 113 and the second splicing surface 114 which are oppositely arranged in the second direction X. The first splicing surface 113 of the first stator 115 is arranged adjacent to the second splicing surface 114 of the second stator 125. The armature winding 11 of the first stator 115 further includes the first protrusion 12 protruding from the upper part of the first splicing surface 113, and the armature winding 11 of the second stator 125 further includes the second protrusion 14 protruding from the lower part the second splicing surface 114. Each of the first protrusion 12 and the second protrusion 14 is provided with the plurality of armature coils 13.

The linear stator segment 110 and the arc stator segment 120 are connected through the first stator 115 and second stator 125. The first stator 115 and the second stator 125 are spliced in the second direction X, the first protrusion 12 of the first stator 115 and the second protrusion 14 of the second stator 125 are stacked in the first direction Z, the first protrusion 12 of the first stator 115 abuts against or is provided with a certain gap with the second splicing surface 114 of the second stator 125, and the first splicing surface 113 of the first stator 115 abuts against or is provided with a certain gap with the second protrusion 14 of the second stator 125. All the armature coils 13 arranged in the first protrusion 12 and the second protrusion 14 may form one or more sets of three-phase armature windings.

An excitation magnetic field generated by each three-phase armature winding and a magnetic field of the mover module 3 may interact to push the mover module 3 to move along the guide rail 4.

In some embodiments, each stator module 1 is provided with the first protrusion 12 protruding from the first splicing surface 113 and the second protrusion 14 protruding from the second splicing surface 114. The first protrusion 12 may be located at the upper part of the first splicing surface 113 and the second protrusion 14 may be located at the lower part of the second splicing surface 114. When the three stator modules 1 are spliced in the second direction X, the first protrusion 12 of the middle stator module 1 and the second protrusion 14 of one adjacent stator module 1 are stacked in the first direction Z, and the second protrusion 14 of the middle stator module 1 and the first protrusion 12 of another adjacent stator module 1 are stacked in the first direction Z.

By arranging the protrusions, the armature coils 13 of the fan-shaped stator module 1 and the linear stator module 1 may also be coupled with each other at the joint, thereby increasing the kinematic accuracy of the mover module 3, and more easily controlling the movement of the mover module 3. Furthermore, the mover module 3 may still have a higher speed when running to the joint, so as to ensure the continuity of the high-speed operation of the mover module 3.

The mover module 3 in the embodiments of the disclosure has an absolute positioning accuracy during the movement, the absolute positioning accuracy is configured to ensure the kinematic accuracy of the movement of the mover module 3, the absolute positioning accuracy has an absolute positioning point, and an error value between the movement position of the mover module 3 and the absolute positioning point is the absolute positioning accuracy. Due to the structural arrangement of the protrusions of the stator module 1 in the disclosure, the conveyor system 100 may flexibly control the starting and stopping of the mover module 3, and may precisely stop the mover module 3 to any position, thereby enabling the joint of the linear stator module and the fan-shaped stator module to also serve as the absolute positioning point of the absolute positioning accuracy. The arrangement of the protrusions may increase the kinematic accuracy of the mover module 3 while more accurately controlling the movement of the mover module 3, so that the mover module 3 may maintain higher or consistent absolute positioning accuracy throughout the motion trajectory. Furthermore, when the mover module 3 runs to different positions, the stator module 1 may control the moving speed of the mover module 3 at any time, so that the mover module 3 has real-time changing speeds at different positions.

In the embodiments of the disclosure, whether an iron core is arranged in the armature coil 13 is not defined, and when the armature coil 13 without the iron core is energized, a slot effect may be solved. When the armature coil 13 having the iron core is energized, the magnetic flux may be increased. In some embodiments, the stator module 1 further includes a fourth driver. The fourth driver may be a circuit board, and the circuit board includes a board body and circuit components such as a driving controller, a voltage converter and a signal transmitter arranged on the board body. The driving controller may be a Central Processing Unit (CPU) or a power controller, and the signal transmitter may be a sensor. The armature winding 11 is electrically connected with the circuit board, and the driving controller is configured to control the energization and de-energization of each armature coil 13 of the armature winding 11. A connection mode between the armature winding 11 and the circuit board may be as follows: the stator module 1 includes the fourth driver, the fourth driver is fixedly arranged on the stator body 10 and electrically connected with the armature winding 11, and an electrical connection mode between the fourth driver and the armature winding 11 is a wire connection, a plug connection or welding, etc. Or, the stator module 1 includes the fourth driver, the fourth driver being fixedly arranged on the stator body 10, and the armature coils 13 being printed on the fourth driver.

Figure 24:
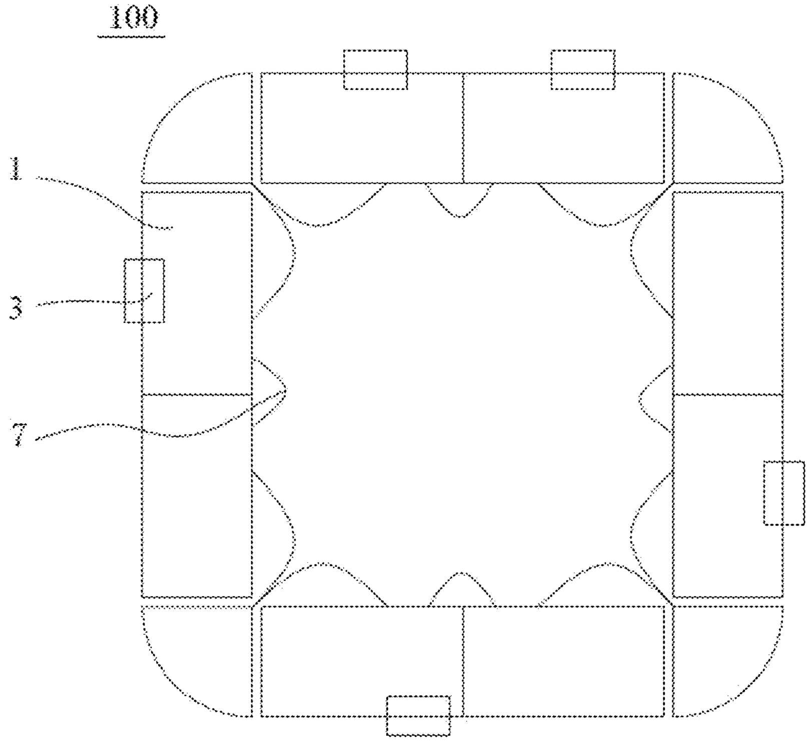
FIG. 24 is a schematic structural diagram of a stator module connection in a conveyor system according to some embodiments of the disclosure.

As shown in FIG. 24, in some embodiments, the fourth driver is fixedly arranged on the stator body 10 and electrically connected with the armature winding 11, and the fourth drivers are electrically connected through an optical fiber 7. That is, the driver of each stator module 1 achieves high-speed signal transmission through the optical fiber 7. In addition, for the conveyor system 100 in the embodiments of the disclosure, a ring topology may be used to connect the fourth drivers at different positions, the arrangement of the ring topology may reduce the length of the optical fiber 7, and the optical fiber 7 may improve the transmission speed and anti-interference capability of a signal, so that an error rate of transmitted information is greatly reduced. In some alternative structures, the conveyor system 100 may also use a star topology to connect different fourth drives, the star topology may be arranged to simply control the armature coils 13, and the operation of other fourth drivers may not be affected when one single fourth driver is damaged.

Figure 25:
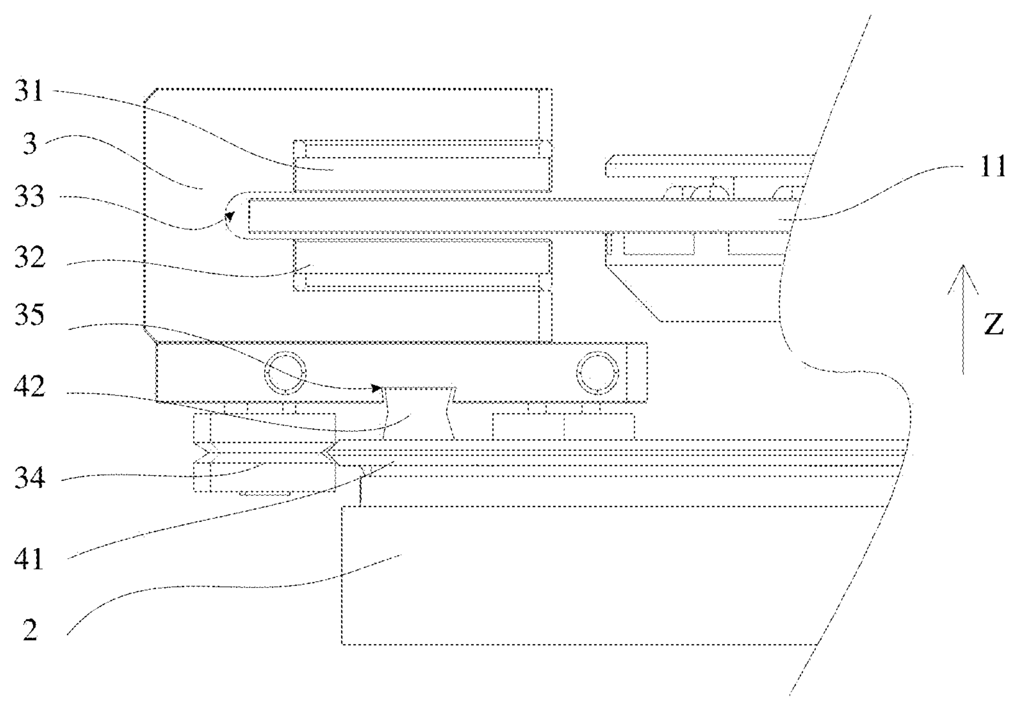
FIG. 25 is a schematic side view of a conveyor system according to some embodiments of the disclosure.

In some embodiments, as shown in FIG. 25, the mover module 3 includes a first permanent magnet 31 and a second permanent magnet 32. The first permanent magnet 31 and the second permanent magnet 32 are spaced apart in the first direction Z, and a matching groove 33 capable of being matched with the stator module 1 is formed between the first permanent magnet 31 and the second permanent magnet 32. The guide rail 4 in the embodiments includes a first guide rail 41, the first guide rail 41 being in sliding fit with the mover module 3. For example, rollers 34 may be arranged on the mover module 3, the first guide rail 41 may be a roller guide rail, and the rollers 34 are clamped to both sides of the first guide rail 41 so as to have a guiding effect on the movement of the mover module 3.

In conjunction with FIGS. 22 and 25, in some embodiments, the conveyor system 100 may further include an auxiliary guide rail 6 arranged at an outside of the guide rail 4. The machining accuracy of the auxiliary guide rail 6 is higher than the machining accuracy of the first guide rail 41, so that the guide accuracy of the auxiliary guide rail 6 is higher than the guide accuracy of the first guide rail 41. It is understandable that the mover module 3 may be in rolling fit with the first guide rail 41 using the rollers 34, and the mover module 3 may be in sliding fit with the auxiliary guide rail 6 using ball sliders. Further, the guide rail 4 further includes a second guide rail 42 corresponding to the auxiliary guide rail 6. The second guide rail 42 is stacked on the first guide rail 41 in a direction away from the base 2, and a length of the second guide rail 42 is less than or equal to a length of the auxiliary guide rail 6.

It is understandable that the mover module 3 is provided with a guide groove 35 corresponding to the second guide rail 42, and the guide groove 35 is in sliding fit with the second guide rail 42. The mover module 3 is provided with a pair of rollers 34 corresponding to the first guide rail 41, and the rollers 34 are in rolling fit with the first guide rail 41. When the mover module 3 moves on the common first guide rail 41, the mover module 3 has a repeated positioning accuracy, and the repeated positioning accuracy is ensured by the guide accuracy of the first guide rail 41. The mover module 3 is provided with the guide groove 35 corresponding to the second guide rail 42, and the guide groove 35 is in sliding fit with the second guide rail 42. It is understandable that since the second guide rail 42 is corresponding to the auxiliary guide rail 6, and the length of the second guide rail 42 is less than or equal to the length of the auxiliary guide rail 6, that is, when the mover module 3 is in sliding fit with the second guide rail 42, the mover module 3 is in sliding fit with the auxiliary guide rail 6 at this moment, and since the second guide rail 42 is stacked on the first guide rail 41 in a direction away from the base 2, when the mover module 3 is in sliding fit with the second guide rail 42, the moving position of the mover module 3 moves upwards in a direction away from the base 2, at this moment, the rollers 34 of the mover module 3 are released from a sliding connection with the first guide rail 41, the second guide rail 42 serves for supporting and guiding the movement of the mover module 3, and the auxiliary guide rail 6 is configured to ensure the kinematic accuracy of the mover module 3. Further, when the mover module 3 moves on the high-accuracy auxiliary guide rail 6, since the guide accuracy of the high-accuracy auxiliary guide rail 6 is higher than the guide accuracy of the first guide rail 41, the repeated positioning accuracy is ensured by the accuracy of the high-accuracy auxiliary guide rail 6, and the repeated positioning accuracy may reach a micron level at this time. The arrangement of the high-accuracy auxiliary guide rail 6 may also improve the kinematic accuracy of the mover module 3 at the joint of the guide rail 4.

Movement modes of the mover module 3 on the high-accuracy auxiliary guide rail 6 and the common first guide rail 41 may be the same or different. For example, the mover module 3 may move on both the auxiliary guide rail 6 and the first guide rail 41 by a rolling connection of the rollers/ball sliders and a sliding connection of the sliders. For another example, the movement modes of the mover module 3 on the auxiliary guide rail 6 and the first guide rail 41 are different, for example, the mover module 3 moves on the high-accuracy auxiliary guide rail 6 by the sliding connection and on the common first guide rail 41 by the rolling connection.

Figure 23:
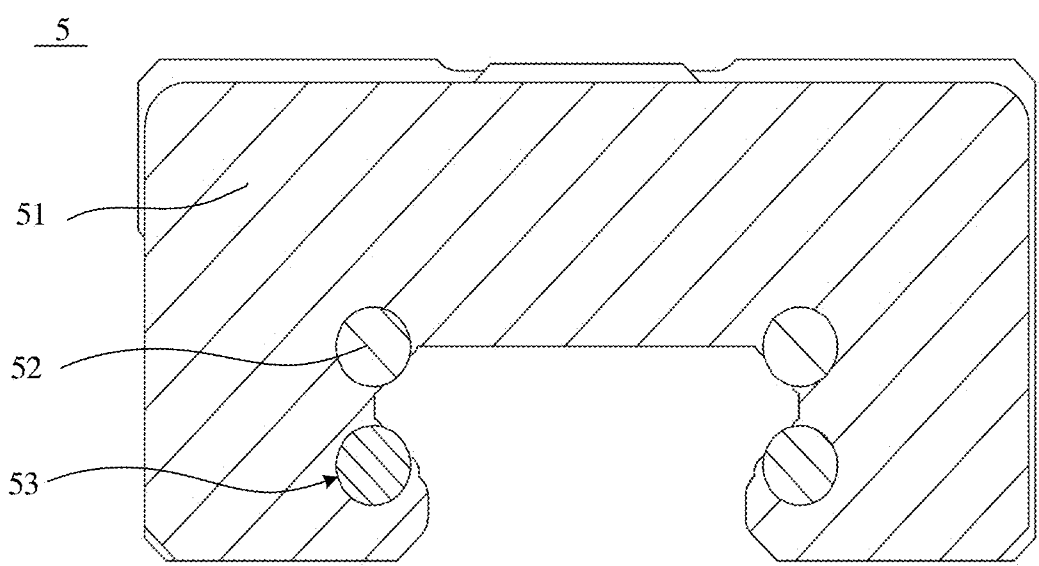
FIG. 23 is a sectional schematic structural diagram of a ball slider according to some embodiments of the disclosure.

Referring to FIG. 23, the ball slider 5 is provided with a slider body 51 and a plurality of balls 52. The slider body 51 is fixedly arranged on the mover module 3, and the slider body 51 is provided with four oppositely arranged holding tanks 53. The plurality of balls 52 are at least partly arranged in the holding tanks 53 and are configured to be in rolling fit with the auxiliary guide rail 6 and tank walls of the holding tanks 53. Thus, the sliding fit of the mover module 3 and the auxiliary guide rail 6 is achieved.

The holding tanks 53 are also provided with notches, and the orthographic projections of the balls 52 covers the notches to prevent the balls 52 from falling out of the holding tanks 53 when the ball slider 5 moves. Further, the slider body 51 is made of carbon steel to better stably place the balls 52 in the holding tanks 53.

Figure 26:
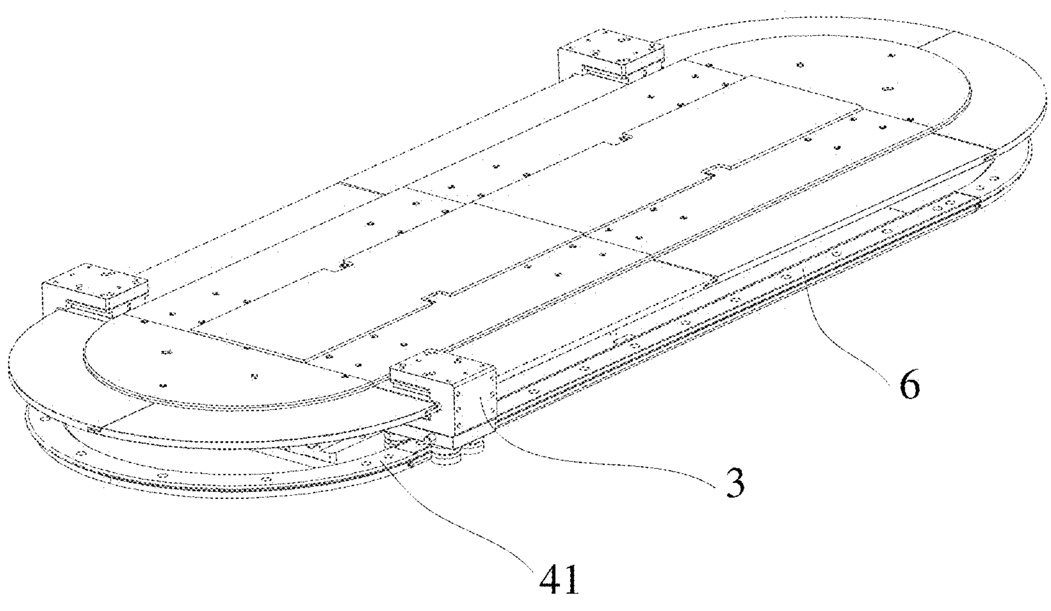
FIG. 26 is another schematic structural diagram of a conveyor system according to some embodiments of the disclosure.

Furthermore, as shown in FIG. 22, the arrangement position of the high-accuracy auxiliary guide rail 6 may be arranged outside an arrangement path of the common first guide rail 41, the auxiliary guide rail 6 is parallel to the first guide rail 41, and the mover module 3 is slidably connected to the auxiliary guide rail 6 and the first guide rail 41 at the same time. As shown in FIG. 26, the auxiliary guide rail 6 may also be arranged in the arrangement path of the first guide rail 41, that is, the auxiliary guide rail 6 is connected to the first guide rail 41, and in this structure, the auxiliary guide rail 6 may be considered as a component of the guide rail 4, and the auxiliary guide rail 6 and the first guide rail 41 are both subjected to a chamfering treatment at the joint. Or, the auxiliary guide rail 6 is connected to the first guide rail 41, and the mover module 3 is provided with the rollers 34 and the ball sliders at the same time. Further, for the structure where the auxiliary guide rail 6 and the first guide rail 41 are arranged in parallel, when the mover module 3 enters the auxiliary guide rail 6, the rolling connection between the mover module 3 and the first guide rail 41 gradually loses effect, the auxiliary guide rail 6 is in sliding fit with the mover module 3 gradually, and at this time, the repeated positioning accuracy of the mover module 3 is ensured by the auxiliary guide rail 6. The arrangement position of the auxiliary guide rail 6 is not limited in the embodiments, the arrangement position of the auxiliary guide rail 6 should be arranged according to the working conditions, and the auxiliary guide rail 6 may be arranged on a linear segment or an arc segment. It is understandable that the high-accuracy auxiliary guide rails 6 may also be arranged at intervals on both sides of the first guide rail 41 in the conveying direction of the conveyor system 100.

The conveyor system 100 may include the linear segment and the arc segment. The linear segment includes a plurality of linear stator modules spliced successively, and the arc segment includes a plurality of fan-shaped stator modules spliced successively. The fan-shaped stator modules may be 90-degree fan-shaped stator modules, and the plurality of 90-degree fan-shaped stator modules may be spliced with each other to form 180-degree, 270-degree and 360-degree sectors, and the plurality of linear stator modules may be connected between the 90-degree fan-shaped stator modules at different positions.

In the description of the disclosure, it is to be understood that the orientations or positional relationships indicated by the orientation words "front, rear, upper, down, left and right", "transverse, longitudinal, vertical and horizontal", "top and bottom", etc. are based on the orientations or positional relationships shown in the accompanying drawings, and are only for the convenience of describing the disclosure and simplifying the description. Unless stated to the contrary, these orientation words do not indicate or imply that the device or element referred to must have a specific orientation, be constructed and operated in a specific orientation, and therefore cannot be construed as limiting the scope of protection of the disclosure. The orientation words "inside and outside" refer to inside and outside relative to the outline of each part itself.

For ease of description, spatially relative terms, such as "above", "over", "on the surface", "upper", etc., may be used herein to describe the spatial positional relationship between a device or feature and other devices or features as shown in the figures. It should be understood that the spatially relative terms are intended to include different orientations of the device in use or operation in addition to the orientation described in the figures. For example, if the devices in the accompanying drawings are inverted, those described as "over other devices or structures" or "above other devices or structures" will then be positioned as "under other devices or structures" or "below other devices or structures". Thus, the exemplary term "over" may include both "over" and "under" orientations. The device may also be positioned in various other ways (rotated 90 degrees or at other orientations) and the spatially relative descriptions used herein are interpreted accordingly.

Furthermore, it is to be noted that the use of the words "first", "second" and the like to define parts is only for the convenience of distinguishing the corresponding parts, unless otherwise stated, the words have no special meaning, and therefore cannot be construed as limiting the scope of protection of the disclosure.

The above is only the preferred embodiments of the disclosure, not intended to limit the disclosure. As will occur to those skilled in the art, the disclosure is susceptible to various modifications and changes. Any modifications, equivalent substitutions, improvements, etc. within the spirit and principle of the disclosure shall fall within the scope of protection of the disclosure.

What is claimed is:

1. A stator module, wherein comprising:

a stator body; and an armature winding, which is fixedly arranged on the stator body, the armature winding being provided with an upper surface and a lower surface which are oppositely arranged in a first direction, and a first splicing surface and a second splicing surface which are oppositely arranged in a second direction perpendicular to the first direction, the armature winding being provided with a first protrusion, and the first protrusion protruding from the first splicing surface in the second direction;

the armature winding is provided with a plurality of armature coils arranged periodically, and at least a part of the plurality of the armature coils is/are arranged in the first protrusion;

the stator module further comprising:

a first driver, which is fixedly arranged on the stator body and electrically connected with the armature winding;

wherein an electrical connection mode between the first driver and the armature winding comprises at least one of a wire connection, a plug connection, and welding;

or, the stator module further comprises:

a first driver, which is fixedly arranged on the stator body, the first driver being printed with the armature coils.

2. The stator module according to claim 1, wherein the armature winding further comprises:

a second protrusion, the second protrusion protruding from the second splicing surface in a direction opposite to the second direction, and at least a part of the plurality of the armature coils being arranged in the second protrusion.

3. The stator module according to claim 2, wherein the armature winding comprises a plurality of U-phase armature coils, a plurality of V-phase armature coils and a plurality of W-phase armature coils, the U-phase armature coils, the V-phase armature coils and the W-phase armature coils together forming a plurality of three-phase armature windings, the armature winding being formed by stacking a plurality of layers of the armature coils, and in the second direction, the armature coils being periodically arranged in phase sequence.

4. The stator module according to claim 3, wherein, for any three-phase armature winding, the U-phase armature coil, the V-phase armature coil and the W-phase armature coil are located in a same layer, and in the second direction, the U-phase armature coil, the V-phase armature coil and the W-phase armature coil are arranged at intervals in phase sequence;

or, in the first direction, for any three-phase armature winding, the U-phase armature coil and the W-phase armature coil are located in a same layer, and the V-phase armature coil is located in an adjacent layer and at a center of the U-phase armature coil and the W-phase armature coil;

or, in the first direction, the U-phase armature coil, the W-phase armature coil, and the V-phase armature coil are distributed in three layers.

5. The stator module according to claim 2, wherein, in the first direction, the first protrusion is provided with a first upper surface and a first lower surface which are oppositely arranged, and the first upper surface is co-planar with the upper surface;

in the first direction, the second protrusion is provided with a second upper surface and a second lower surface which are oppositely arranged, and the second lower surface is co-planar with the lower surface;

wherein the first lower surface is co-planar with the second upper surface, or, the first lower surface is parallel to the second upper surface, and a distance between the first lower surface and the second upper surface is 0.1 mm-1 mm.

6. The stator module according to claim 2, wherein the stator body is fan-shaped, the armature winding is arc-shaped, and a plane where the first splicing surface is located is perpendicular to a plane where the second splicing surface is located; or, a plane where an end surface of the first protrusion is located is perpendicular to a plane where an end surface of the second protrusion is located.

7. The stator module according to claim 2, further comprising:

a cooling fan, which is installed on the stator body, the cooling fan being provided with an air outlet;

wherein the armature winding is arranged on a side, away from the air outlet, of the stator body, the stator body is provided with an air guide channel communicating with the air outlet, and airflow from the air outlet flows through the armature winding through the air guide channel.

8. The stator module according to claim 7, wherein the stator body is provided with a first surface facing the air outlet and a second surface facing away from the air outlet, the second surface is provided with a groove into which the armature winding is partly inserted, the air guide channel penetrates through the first surface and the second surface, and the air guide channel communicates with a side groove wall of the groove.

9. The stator module according to claim 8, wherein there are plurality of air guide channels, all the air guide channels are arranged at intervals in the second direction, and a central axis in an extension direction of each air guide channel is perpendicular to the second direction.

10. The stator module according to claim 8, wherein the air guide channels are distributed on both sides of the armature winding in a third direction, and the third direction is perpendicular to the second direction.

11. The stator module according to claim 7, wherein the stator body is provided with a first surface facing the air outlet, the first surface is provided with a mounting groove, and the stator body further comprises a circuit board, the circuit board being located in the mounting groove and electrically connected with the armature winding.

12. The stator module according to claim 7, wherein the stator module further comprises a fixed support, the cooling fan being connected to the stator body through the fixed support.

13. The stator module according to claim 12, wherein the stator module further comprises a cooling panel, the cooling panel being arranged at a bottom of the cooling fan, and the cooling fan being connected to the fixed support through the cooling panel.

14. A conveyor system, comprising:

a base;

a guide rail, which is laid in a conveying direction and fixedly arranged on the base;

a plurality of stator modules according to claim 2, the plurality of stator modules being successively spliced in the conveying direction; and a mover module, which is in sliding fit with the guide rail and coupled with the armature winding.

15. The conveyor system according to claim 14, wherein, for two adjacent stator modules, the first protrusion of one armature winding is spliced to the second protrusion of the other armature winding, and at least part of the armature coils in the first protrusion and at least part of the armature coils in the second protrusion are stacked together to form at least one three-phase armature winding.

16. The conveyor system according to claim 15, wherein the armature winding comprises a plurality of U-phase armature coils, a plurality of V-phase armature coils and a plurality of W-phase armature coils, the U-phase armature coils, the V-phase armature coils and the W-phase armature coils together forming a plurality of three-phase armature windings, the armature winding being formed by stacking a plurality of layers of the armature coils, and in the second direction, the armature coils being periodically arranged in phase sequence;

for any three-phase armature winding formed by splicing the first protrusion and the second protrusion, the U-phase armature coil, the V-phase armature coil and the W-phase armature coil are located in a same layer, and in the second direction, the U-phase armature coil, the V-phase armature coil and the W-phase armature coil are arranged at intervals in phase sequence;

or, in the first direction, for any three-phase armature winding, the U-phase armature coil and the W-phase armature coil are located in a same layer, and the V-phase armature coil is located in an adjacent layer and at a center of the U-phase armature coil and the W-phase armature coil; or, in the first direction, the U-phase armature coil, the W-phase armature coil, and the V-phase armature coil are distributed in three layers.

17. The conveyor system according to claim 14, wherein the first protrusion is provided with a first upper surface and a first lower surface which are oppositely arranged in the first direction, and the first upper surface is co-planar with the upper surface;

the second protrusion is provided with a second upper surface and a second lower surface which are oppositely arranged in the first direction, and the second lower surface is co-planar with the lower surface;

wherein, for two adjacent stator modules, the upper surface of one armature winding is co-planar with the upper surface of the other armature winding, the lower surface of one armature winding is co-planar with the lower surface of the other armature winding, the first lower surface of one armature winding is parallel to the second upper surface of the other armature winding, and a distance between the first lower surface and the second upper surface is 0.1 mm-1 mm.

18. The conveyor system according to claim 14, wherein the stator module further comprises:

a fourth driver, which is fixedly arranged on the stator body and electrically connected with the armature winding, and the fourth driver of each stator module of the plurality of stator modules achieves signal transmission through optical fiber.

19. The conveyor system according to claim 14, wherein the guide rail is provided with an auxiliary guide rail and a first guide rail, the auxiliary guide rail and the first guide rail are both configured to be in sliding fit with the mover module, and a guide accuracy of the auxiliary guide rail is higher than a guide accuracy of the first guide rail.

20. The conveyor system according to claim 19, wherein, in the conveying direction, the auxiliary guide rail is parallel to the first guide rail, the auxiliary guide rail is arranged on at least one side of the first guide rail, and the guide rail further comprises a second guide rail corresponding to the auxiliary guide rail, the second guide rail being stacked on the first guide rail in a direction away from the base, and a length of the second guide rail being less than or equal to a length of the auxiliary guide rail.

21. The conveyor system according to claim 19, wherein, in the conveying direction, the auxiliary guide rail and the first guide rail are connected to each other, and each of the auxiliary guide rail and the first guide rail is provided with a chamfer at a joint.

22. The stator module according to claim 1, wherein the first driver is an integrated circuit board, and the first driver is a PCB winding when the first driver is printed with the armature coils.

23. The stator module according to claim 22, wherein, there are a plurality of first drivers printed with the armature coils, the plurality of first drivers are stacked in the first direction, and/or, the plurality of first drivers are stacked in the second direction, and the plurality of first drivers form the armature winding.

24. A conveyor system, comprising:

a base;

a guide rail, which is laid in a conveying direction and fixedly arranged on the base; and a plurality of stator modules according to claim 1, the plurality of stator modules being spliced to each other in the conveying direction, and the stator body being fixedly arranged on the base.

25. The conveyor system according to claim 24, wherein, for two adjacent stator modules, the first protrusion of one armature winding is spliced to the first protrusion of the other armature winding, and at least part of the armature coils in two first protrusions are stacked together to form at least one three-phase armature winding.

* * * * *